United States Patent
Nakajima et al.

(10) Patent No.: US 9,906,753 B2
(45) Date of Patent: Feb. 27, 2018

(54) IMAGING DEVICE, IMAGING APPARATUS, AND ELECTRONIC APPARATUS

(71) Applicant: SONY CORPORATION, Tokyo (JP)

(72) Inventors: Tsutomu Nakajima, Tokyo (JP); Jun Hashizume, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/023,452

(22) PCT Filed: Dec. 12, 2014

(86) PCT No.: PCT/JP2014/006212
§ 371 (c)(1),
(2) Date: Mar. 21, 2016

(87) PCT Pub. No.: WO2015/093022
PCT Pub. Date: Jun. 25, 2015

(65) Prior Publication Data
US 2016/0381319 A1    Dec. 29, 2016

(30) Foreign Application Priority Data

Dec. 20, 2013  (JP) ................................ 2013-263378
Sep. 18, 2014  (JP) ................................ 2014-190163

(51) Int. Cl.
*H04N 5/232* (2006.01)
*H04N 5/915* (2006.01)
*H04N 5/225* (2006.01)
*H04N 5/14* (2006.01)
*H04N 5/77* (2006.01)

(52) U.S. Cl.
CPC ............ *H04N 5/915* (2013.01); *H04N 5/147* (2013.01); *H04N 5/225* (2013.01); *H04N 5/23245* (2013.01); *H04N 5/23254* (2013.01); *H04N 5/23296* (2013.01); *H04N 5/77* (2013.01)

(58) Field of Classification Search
None
See application file for complete search history.

(56) References Cited

U.S. PATENT DOCUMENTS

| | | | |
|---|---|---|---|
| 2004/0081437 A1* | 4/2004 | Asada | H04N 5/77 386/233 |
| 2006/0114334 A1* | 6/2006 | Watanabe | H04N 5/232 348/222.1 |
| 2007/0091204 A1 | 4/2007 | Koshimizu et al. | |
| 2009/0059031 A1* | 3/2009 | Miyakoshi | H04N 3/155 348/222.1 |

(Continued)

FOREIGN PATENT DOCUMENTS

| | | |
|---|---|---|
| EP | 2 129 108 A1 | 12/2009 |
| EP | 2 234 387 A1 | 9/2010 |

OTHER PUBLICATIONS

International Search Report and Written Opinion prepared by the European Patent Office dated May 13, 2015, for International Application No. PCT/JP2014/006212.

*Primary Examiner* — Stephen Coleman
(74) *Attorney, Agent, or Firm* — Sheridan Ross P.C.

(57) ABSTRACT

There is provided an imaging device that includes a pixel generation unit that generates an image signal formed from a plurality of pixel signals according to incident light, and a frame memory that stores the image signal of a plurality of frames.

19 Claims, 17 Drawing Sheets

(56) References Cited

U.S. PATENT DOCUMENTS

| | | | |
|---|---|---|---|
| 2010/0245647 A1* | 9/2010 | Honda | H01L 27/14634 348/308 |
| 2011/0221931 A1* | 9/2011 | Wakabayashi | G01K 7/01 348/229.1 |
| 2013/0028570 A1 | 1/2013 | Suematsu et al. | |

* cited by examiner

IMAGING DEVICE, IMAGING APPARATUS, AND ELECTRONIC APPARATUS

CROSS REFERENCE TO RELATED APPLICATIONS

This application is a national stage application under 35 U.S.C. 371 and claims the benefit of PCT Application No. PCT/JP2014/006212 having an international filing date of 12 Dec. 2014, which designated the United States, which PCT application claimed the benefit of Japanese Patent Application No. 2013-263378 filed 20 Dec. 2013, and Japanese Patent Application No. 2014-190163 filed 18 Sep. 2014, the disclosures of which are incorporated herein by reference in their entirety.

TECHNICAL FIELD

The present disclosure relates to an imaging device, an imaging apparatus, and an electronic apparatus, particularly to an imaging device, an imaging apparatus, and an electronic apparatus by which a moving picture imaged at an ultra high speed (super slow moving picture) can be obtained with relatively low power consumption

BACKGROUND ART

Usually, a frame rate of a moving picture imaged by an imaging device is approximately 30 fps, and in a case of an attempt to realize a high speed frame rate faster than above, in many cases, an upper limit of the imaging device in practical usage is limited by a bandwidth of an I/F and the power consumption. For example, in a case of a full high-definition moving picture in which an amount of data per one pixel is 10 bits and a resolution is 1920×1080 is output at 1000 fps, it is necessary for an I/F which communicates the image data to have a bandwidth of equal to or larger than 20 Gbps.

On the other hand, a bandwidth of an I/F of a mobile device such as a mobile phone is merely about four to six Gbps even if it has a high speed. Therefore, the above-described effect is significantly prominent in a small-type imaging device which is mounted on a mobile device or a consumer camera.

In addition, a moving picture having a resolution of 4K which is 4 times the full high-definition or 8K which is 8 times the full high-definition is expected to spread in the future as well as demand for high speed frame rate increases. Therefore, it is expected that it may be difficult to cope with the above-described limitations by only widening the bandwidth of the I/F.

Furthermore, in a case where the resolution or the frame rate increases, the power consumption in the imaging device or an image signal processing circuit provided in the next stage increases which results in increase in heat generation, and the increase in heat generation is a problem which has to be avoided for mobile devices or consumer cameras.

With regard to this problem, in the related art, a method is proposed, in which, by thinning out the pixels or cutting out a partial area of an image, a high frame rate is realized and the increase of the power consumption and the heat generation can be suppressed by decreasing the number of processed pixels (for example, refer to PTL 1).

CITATION LIST

Patent Literature

PTL 1: Japanese Unexamined Patent Application Publication No. 9-247543

SUMMARY OF INVENTION

Technical Problem

In the method in the related art described above, a high frame rate can be realized, but the resolution of a moving picture deteriorates significantly.

It is desirable to obtain a moving picture imaged at an ultra high speed in which the resolution less deteriorates by suppressing power consumption and heat generation.

Solution to Problem

According to a first embodiment of the present disclosure, there is provided an imaging device that includes: a pixel generation unit that generates an image signal formed from a plurality of pixel signals according to incident light; and a frame memory that stores the image signal of a plurality of frames.

The imaging device according to the first embodiment of the present disclosure may further include a writing unit that writes the generated image data into the frame memory; and a reading unit that reads the image data written into the frame memory.

The writing unit may overwrite the generated image data into a first area of the frame memory; and the reading unit may thin out and read the image data overwritten into the first area of the frame memory in a frame unit.

The writing unit may overwrite the image data generated at a first frame rate into a first area of the frame memory, and the reading unit may thin out and read the image data at a second frame rate slower than the first frame rate, which is overwritten into the first area of the frame memory at the first frame rate.

The imaging device according to the first embodiment of the present disclosure may further include an encoding unit that encodes the image data written into the frame memory; and a decoding unit that decodes the coded image data read from the frame memory.

The imaging device according to the first embodiment of the present disclosure may further include a control unit that, according to a trigger, controls the writing unit and causes the overwriting of the generated image data into the first area of the frame memory to stop.

The control unit may control the writing unit immediately or after a delay for a pre-determined number of frames, and cause the overwriting of the generated image data into the first area of the frame memory to stop according to the trigger.

By an instruction from the outside as the trigger, the control unit may control the writing unit and cause the overwriting of the generated image data into the first area of the frame memory to stop.

The imaging device according to the first embodiment of the present disclosure may further include a detection unit that detects a high-speed transition scene in the image data overwritten into the first area of the frame memory. By the detection of the high-speed transition scene as the trigger, the control unit may control the writing unit, and cause the overwriting of the generated image data into the first area of the frame memory to stop.

The reading unit may read the imaged data remaining in the first area of the frame memory due to the stopping of the overwriting with respect to the first area of the frame memory.

The writing unit may write the generated image data into a second area of the frame memory which is different from the first area after the overwriting the image data of the frame memory with respect to the first area is stopped, and the reading unit may read the image data written into the second area of the frame memory, and may further read the image data remaining in the first area of the frame memory due to the stopping of the overwriting.

The writing unit may write the generated image data generated at the second frame rate slower than the first frame rate into the second area of the frame memory which is different from the first area after the overwriting of the image data of the frame memory at the first frame rate with respect to the first area being stopped, and the reading unit may read the image data at the second frame rate which is written into the second area of the frame memory, and further may read the image data remaining in the first area of the frame memory due to the stopping of the overwriting.

The pixel generation unit may perform at least one of changing an angle of view of the generated image data or adding the pixel signals.

The imaging device according to the first embodiment of the present disclosure may be disposed on one or a plurality of substrates and may be formed in a single chip.

According to the second embodiment of the present disclosure, there is provided an imaging apparatus on which an imaging device is mounted. The imaging device includes a pixel generation unit that generates an image signal formed from a plurality of pixel signals according to incident light, and a frame memory that stores the image signal of a plurality of frames.

According to the third embodiment of the present disclosure, there is provided an electronic apparatus on which an imaging device is mounted. The imaging device that includes a pixel generation unit that generates an image signal formed from a plurality of pixel signals according to incident light, and a frame memory that stores the image signal of a plurality of frames.

In the first to third embodiments of the present disclosure, the image signal formed from a plurality of pixel signals according to the incident light is generated, and is written into the frame memory that stores the image signal of a plurality of frames.

According to the fourth embodiment of the present disclosure, there is provided an imaging apparatus that includes an imaging device and an ISP processing unit. The imaging device includes a pixel generation unit that generates an image signal formed from a plurality of pixel signals according to incident light at a first frame rate, an encoder that encodes the image signal, and an output unit that outputs the encoded image signal to the ISP processing unit at the first frame rate. The ISP processing unit includes a frame memory that stores the encoded image signal of a plurality of frames, a writing unit that writes the encoded image signal input from the imaging device into the frame memory at the first frame rate, and an ISP unit that reads the encoded image data at a second frame rate slower than the first frame rate, which is written in the frame memory, and performs the decoding and ISP processing.

The ISP processing unit may further include a control unit that, according to a trigger, controls the writing unit and causes the overwriting of the encoded image data into the frame memory to stop.

The imaging device may further include a detection unit that detects a high-speed transition scene in the generated image data, and the control unit may use the detection of the high-speed transition scene as the trigger.

The ISP processing unit may further include a decoder that decodes the encoded image signal input from the imaging device, and a detection unit that detects a high-speed transition scene in the decoded image data. The control unit may use the detection of the high-speed transition scene as the trigger.

In the imaging device according to the fourth embodiment of the present disclosure, the generated and encoded image signal is output to the ISP processing unit at the first frame rate. In the ISP processing unit, the encoded image signal is written into the frame memory at the first frame rate, and the encoded image data written in the frame memory is read at the second frame rate slower than the first frame rate, and the decoding and the ISP processing are performed thereon.

According to the fifth embodiment of the present disclosure, there is provided an imaging apparatus that includes an imaging device and an ISP processing unit. The imaging device includes a pixel generation unit that generates an image signal formed from a plurality of pixel signals according to incident light at a first frame rate, an encoder that encodes the image signal, and an output unit that outputs the encoded image signal to the ISP processing unit at the first frame rate. The ISP processing unit includes a frame memory that stores the encoded image signal of a plurality of frames, and an ISP unit that reads the encoded image data at a second frame rate slower than the first frame rate, which is written in the frame memory, and performs the decoding and ISP processing.

In the imaging device according to the fifth embodiment of the present disclosure, the generated and encoded image signal is written into the frame memory of the ISP processing unit at the first frame rate. In the ISP processing unit, the encoded image data written in the frame memory is read at the second frame rate slower than the first frame rate, and the decoding and the ISP processing are performed thereon.

Advantageous Effects of Invention

According to the first to fifth embodiments of the present disclosure, it is possible to obtain a moving picture imaged at an ultra high-speed in which the resolution less deteriorates by suppressing power consumption and heat generation.

DESCRIPTION OF EMBODIMENTS

Hereinafter, a best mode for practicing the present disclosure (hereinafter, referred to as embodiments) will be described in detail with reference to the drawings.

<Configuration Example of an Imaging Device which is a First Embodiment of the Present Disclosure>

Figure 1:
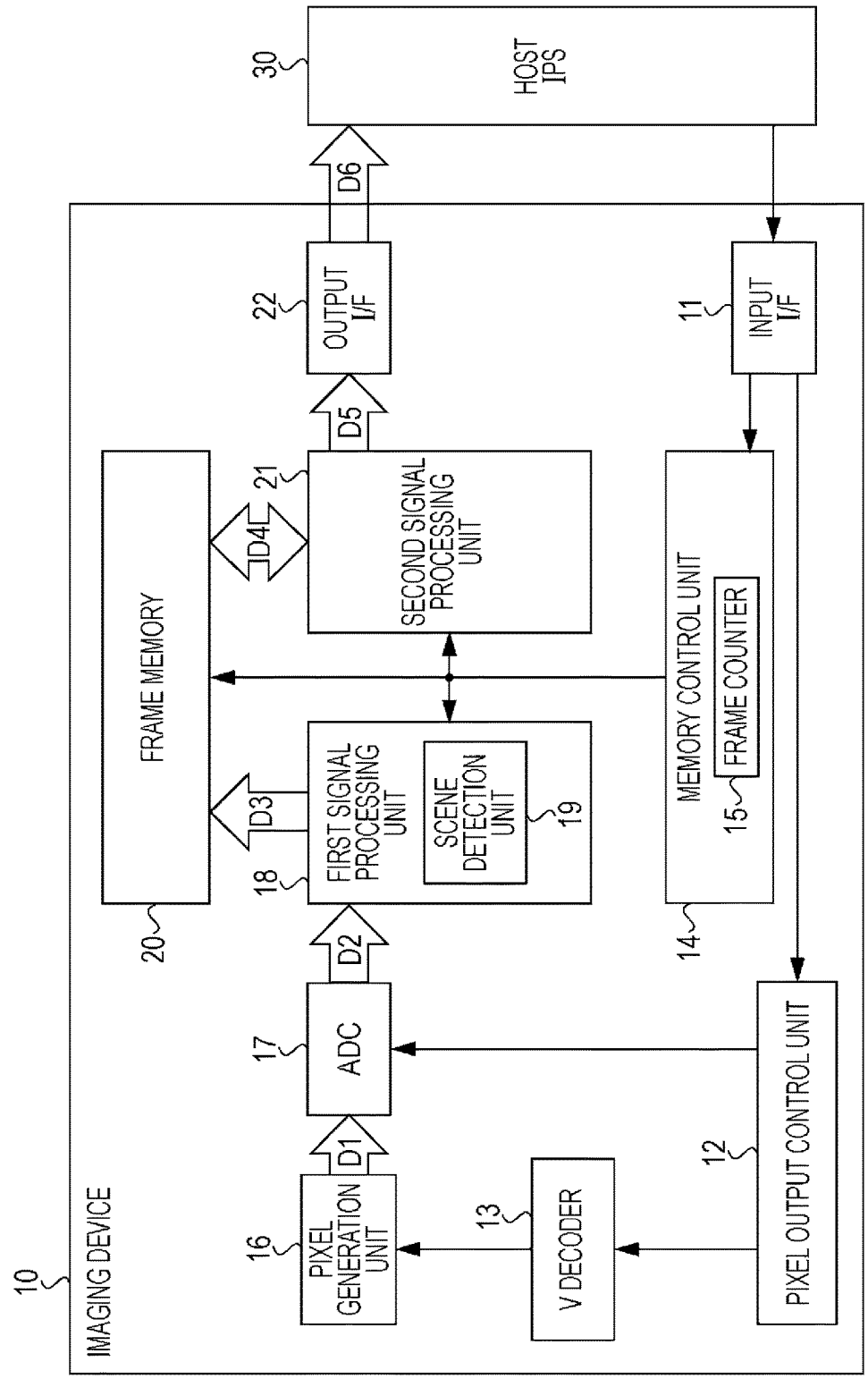
FIG. 1 is a block diagram illustrating a configuration example of an imaging device to which the present disclosure is applied.

FIG. 1 illustrates a configuration example of an imaging device according to a first embodiment of the present disclosure.

An imaging device 10 images a moving picture in accordance with a request from a HOST ISP 30, and outputs the image data in a frame unit.

The imaging device 10 includes an input I/F 11, a pixel output control unit 12, a V decoder 13, a memory control unit 14, a pixel generation unit 16, an AD conversion unit (ADC) 17, a first signal processing unit 18, a frame memory 20, a second signal processing unit 21, and an output I/F 22.

The input I/F 11 is connected to the HOST ISP 30, and outputs various control signals from the HOST ISP 30 to the pixel output control unit 12 or to the memory control unit 14. The pixel output control unit 12 controls the V decoder 13 to drive the pixel generation unit 16 based on the control signal from the HOST ISP 30 via the input I/F 11. In addition, the pixel output control unit 12 controls the AD conversion unit 17 as well. The V decoder 13 drives the pixel generation unit 16 based on the control from the pixel output control unit 12.

The memory control unit 14 controls the writing of the image data into the frame memory 20 by the first signal processing unit 18 and reading the image data from the frame memory 20 by the second signal processing unit 21 based on the control signal from the HOST ISP 30 via the input I/F 11. In addition, in the memory control unit 14, a frame counter 15 is incorporated, and the frame counter 15 counts the number of frames of the image data written into the frame memory 20. Furthermore, the control from the HOST ISP 30 or detection notification of high-speed transition scene (described below) from the first signal processing unit 18 triggers the memory control unit 14 to stop the writing of the imaging data into the frame memory 20.

The pixel generation unit 16 includes a photoelectric conversion element corresponding to a plurality of pixels that generates electric charge corresponding to incident light for each pixel, and outputs a plurality of pixel signals based on the generated electric charge to the AD conversion unit 17 as image data D1.

Figure 2:
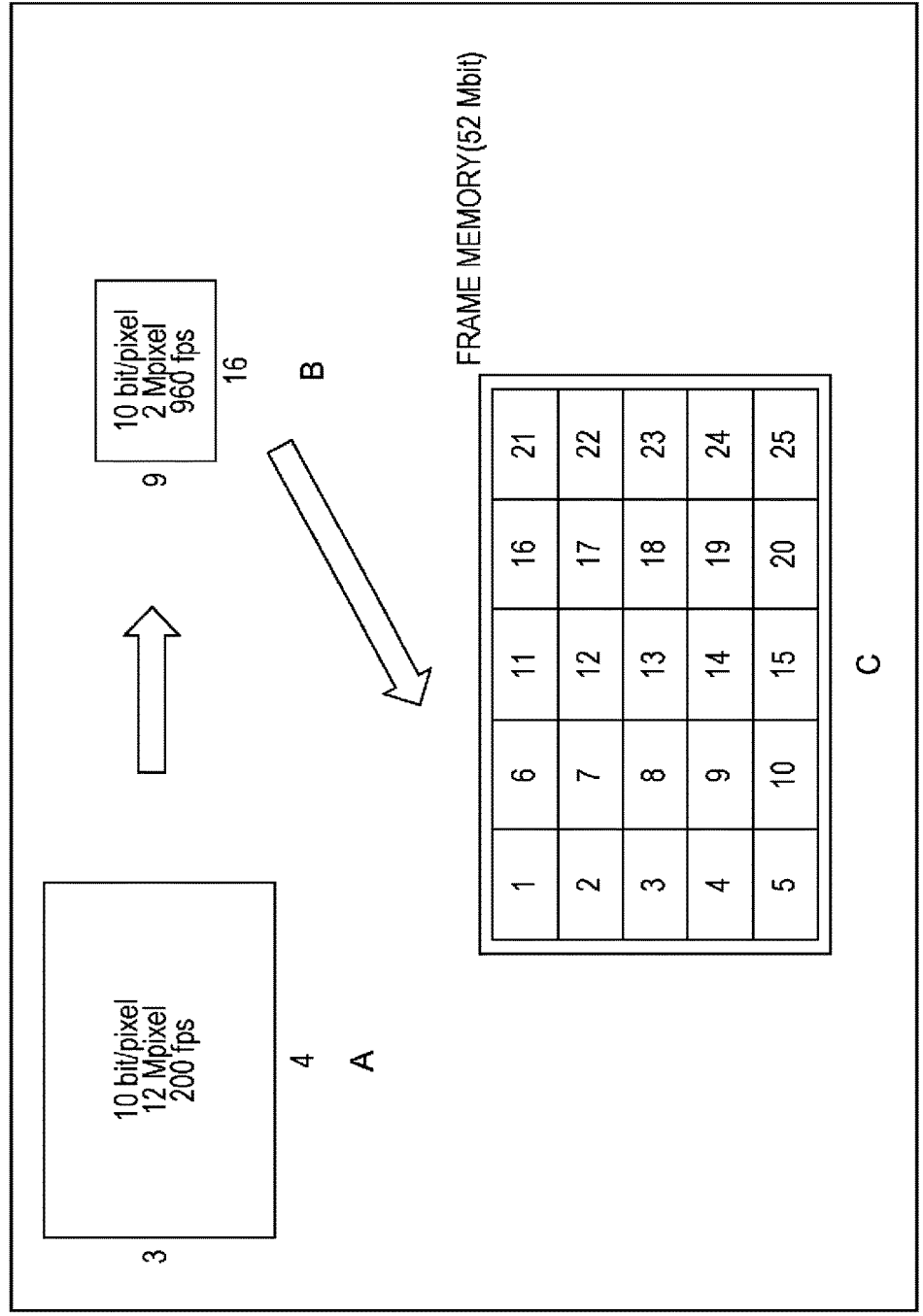
FIG. 2 is a diagram illustrating an overview of an image output from a pixel generation unit and written into a frame memory.

FIGS. 2A to 2C are diagrams illustrating an overview of image data output from the pixel generation unit 16 and written into the frame memory 20.

The pixel generation unit 16 is assumed to have a specification to generate, as illustrated in FIG. 2A, for example, image data of which an amount of data per one pixel is 10 bits, an angle of view is 4:3, and the number of pixels is 12 Mpixels, and to output the image data at 200 fps. In addition, the pixel generation unit 16 is assumed to have a function of adding the generated image data for each 4 pixels of 2×2 and a function of converting the angle of view to 16:9 from 4:3 by removing the top and bottom part of the image. Using these functions, the pixel generation unit 16 can convert the image data of which the angle of view is 4:3, the number of pixels is 12 Mpixels, and the frame speed is 200 fps to the image data D1 of which the angle of view is 16:9, the number of pixels is 2 Mpixels (corresponds to a full high-definition of 1920×1080), as shown in FIG. 2B, and can transfer the image data D1 at 960 fps. At this time, a transfer rate of the image data D1 is 20 Gbps (2M×960×10 bits).

The AD conversion unit 17 digitally converts the image data D1 (10 bits/pixel, the angle of view is 16:9, the number of pixels is 2 Mpixels, and 960 fps) transferred from the pixel generation unit 16 to image data D2 of coded 11 bits/pixel (11 bits/pixel, the angle of view is 16:9, the number of pixels is 2 Mpixels, and 960 fps), and transfers the image data D2 to the first signal processing unit 18. At this time, the transfer rate of the image data D2 is 22 Gbps.

The first signal processing unit 18 performs a signal processing such as a black level compensation processing or a digital conversion processing (hereinafter, referred to as a first signal processing) with respect to the image data D2, which is lighter than a signal processing in the second signal processing unit 21 performed in the next stage. In addition, the first signal processing unit 18 writes image data D3 (10 bits/pixel, the angle of view is 16:9, the number of pixels is 2 Mpixels) obtained as a result of the first signal processing to the frame memory 20 at 960 fps based on the control from the memory control unit 14. At this time, the transfer rate of the image data D3 is 20 Gbps.

In addition, in the first signal processing unit 18, the scene detection unit 19 is incorporated, and in a case where a scene in which an object in an image transits in a high speed (hereinafter, referred to as a high-speed transition scene) is detected by the scene detection unit 19, the first signal processing unit 18 notifies the memory control unit 14 of the detected result.

The frame memory 20 is formed from, for example, a memory capable of allowing high-speed access with high density such as a DRAM or a Spin-RAM, and has a capacity capable of holding as much image data D3 input from the first signal processing unit 18 as at least a plurality of frames.

However, since the frame memory 20 is mounted on the imaging device 10, there is a limitation in size thereof, and the capacity thereof is limited as well. Hereinafter, it is assumed that the capacity of the frame memory 20 is 512 Mbits. In this case, as illustrated in FIG. 2C, the frame memory 20 has a capacity capable of holding the image data D3 of 25 frames. Hereinafter, each capacity for these 25 frames is referred to as area 1 to area 25. In a case where the first signal processing unit 18 writes the image data D3, the image data D3 is written into the area 1 to the area 24 in order, and after the area 24, the writing returns to the area 1 to overwrite the image data D3 into the area 1. Therefore, usually the area 25 of the frame memory 20 is not used (a case where it is used will be described below).

The second signal processing unit 21, based on the control from the memory control unit 14, reads only one frame of the image data D3 per every 35 frames of the image data D3 written into the frame memory 20 by the first signal processing unit 18, and then, reads the one frame as image data D4. At this time, a frame rate of the image data D4 is 30 fps and the transfer rate is 600 Mbps. The second signal processing unit 21 performs a defect correction processing, a noise reduction processing, a scaling processing, and the like on the read image data D4, and transfers image data D5 obtained as a result of those signal processing tasks (hereinafter, referred to as a second signal processing) to the output I/F 22. At this time, the transfer rate of the image data D5 is 600 Mbps.

The first signal processing unit 18 and the frame memory 20, and the frame memory 20 and the second signal processing unit 21 are assumed to be physically connected to each other by a through VIA such as a TSV or a Wide IO, not through an I/F such as a DDR or a substrate. In this way, in the data communications between the first signal processing unit 18 and the frame memory 20, and between the frame memory 20 and the second signal processing unit 21, the bandwidth can be widened by increasing the degree of parallelism compared to the ordinary high-speed I/F, and thus, it is possible to cause the communications to operate at low power consumption.

The output I/F 22 is formed from a MIPI or a Sub LVDS and outputs the image data D5 from the second signal processing unit 21 to the HOST ISP 30 as image data D6.

<Another Configuration Example of the Imaging Device 10>

Figure 3:
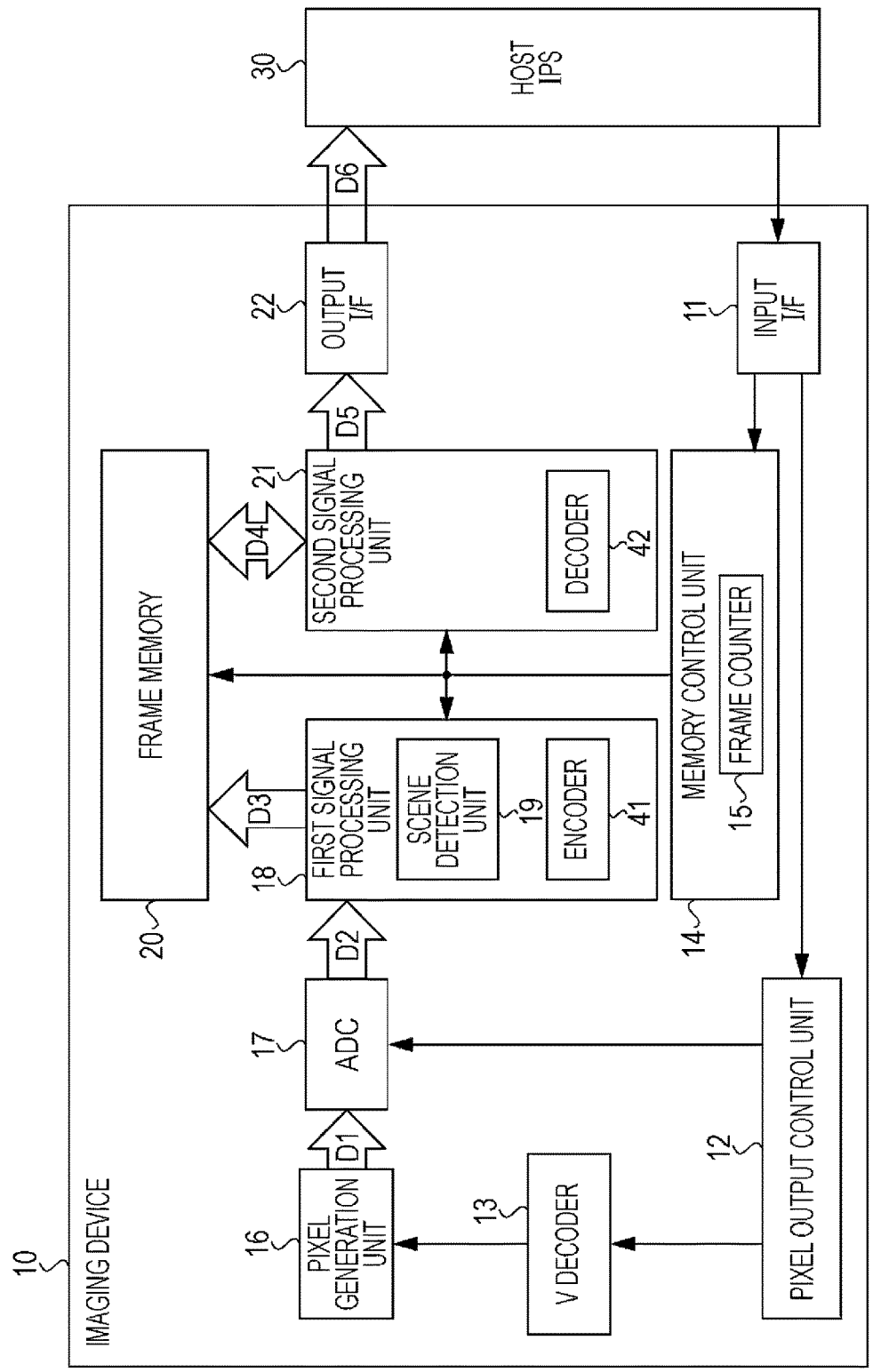
FIG. 3 is a block diagram illustrating a modified configuration example of an imaging device to which the present disclosure is applied.

Next, FIG. 3 illustrates a modified configuration example of the imaging device 10. In the modification example, an encoder 41 that encodes the image data D3 written into the frame memory 20 is added to the first signal processing unit 18, and a decoder 42 that decodes the encoded image data D4 (image data D3) read from the frame memory 20 is added to the second signal processing unit 21.

By adding the encoder 41 and the decoder 42, the amount of data of the image data D3 (image data D4) that is written into the frame memory 20 can be reduced, and thus, it is possible to increase the number of frames of the image data D3 that can be held in the frame memory 20 without increasing the capacity of the frame memory 20. The case where the number of frames of the image data D3 that can be held in the frame memory 20 is increased will be described below with reference to FIG. 13.

FIGS. 4A to 4D illustrate a configuration example in a case of forming the imaging device 10 in a single chip using the configuration elements described above.

Figure 4:
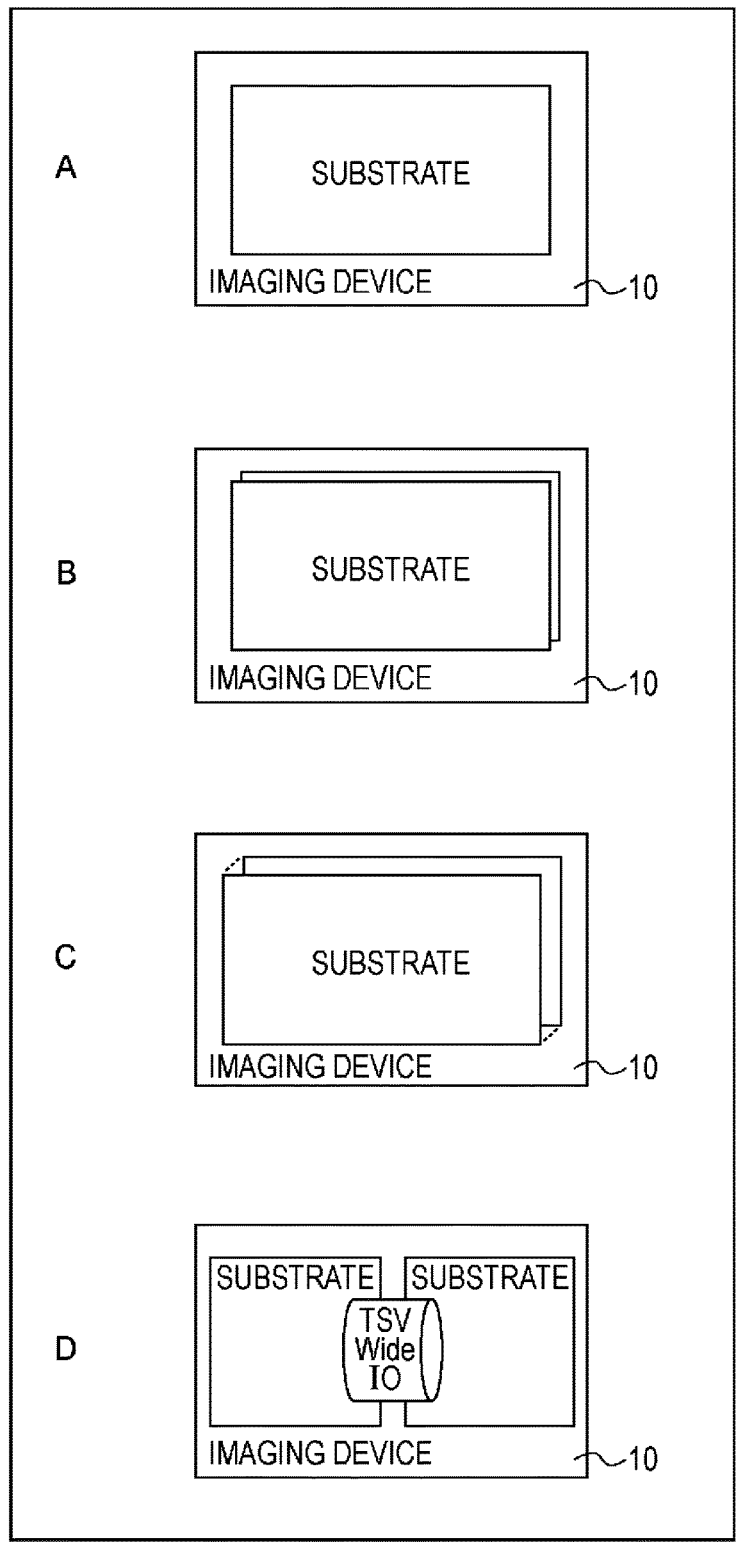
FIG. 4 is a diagram illustrating a configuration example in a case of forming an imaging device in a single chip.

FIG. 4A illustrates a configuration example of forming a single chip by integrating the configuration elements of the imaging device 10 on a single substrate. FIG. 4B illustrates a configuration example of forming a single chip by disposing the configuration elements of the imaging device 10 on two substrates to be laminated. FIG. 4C illustrates a configuration example of forming a single chip by disposing the configuration elements of the imaging device 10 on two or more substrates to be laminated. FIG. 4D illustrates a configuration example of forming a single chip by disposing the configuration elements of the imaging device 10 on two substrates and connecting the two substrates to each other by a TSV Wide IO.

<Description of Operation>

Next, an operation of the imaging device 10 will be described with reference to FIG. 5 to FIG. 12.

Figure 5:
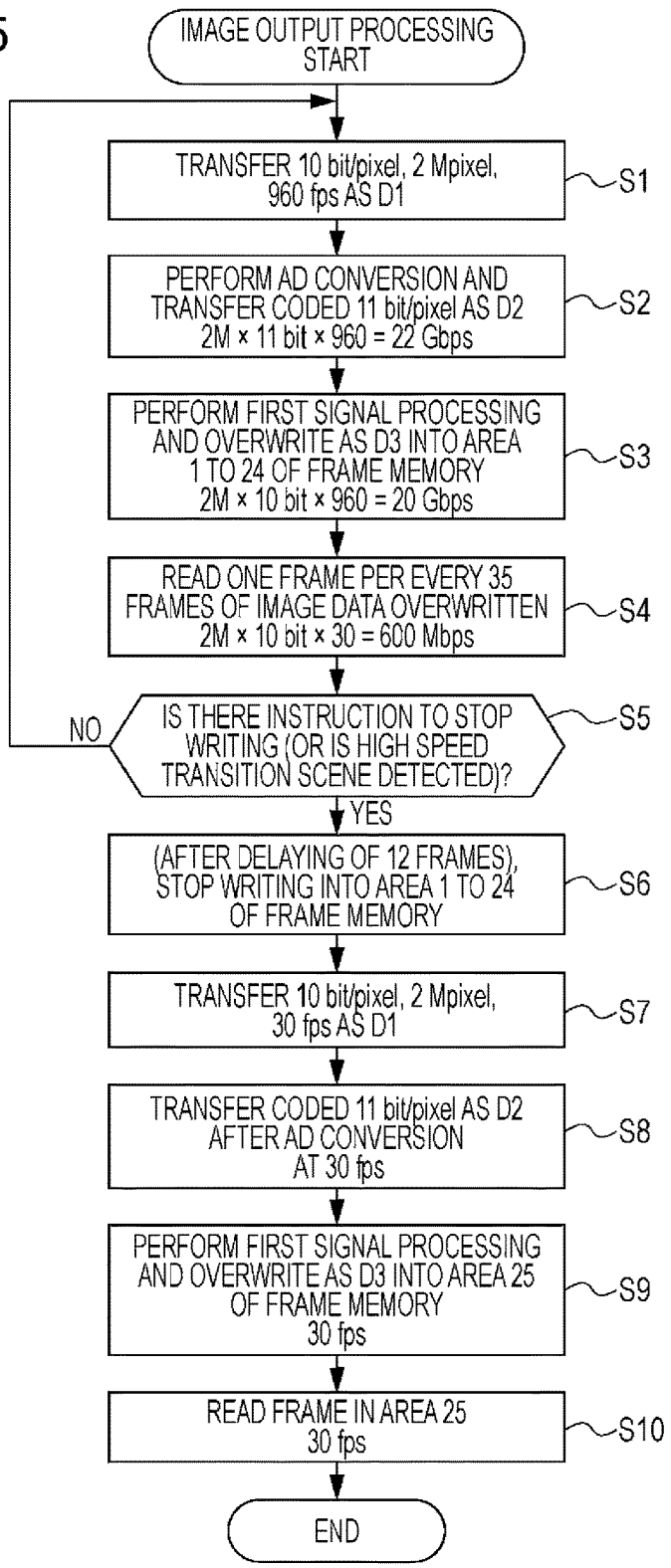
FIG. 5 is a flow chart explaining an image output processing.

FIG. 5 is a flow chart explaining an image output processing of the imaging device 10. FIG. 6 to FIG. 9 are diagrams for explaining an image output processing.

Figure 6:
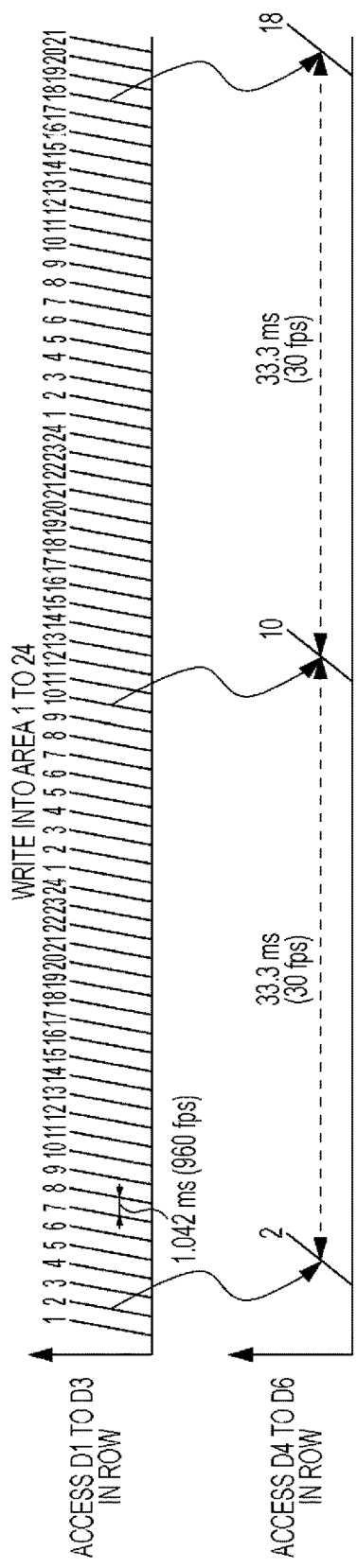
FIG. 6 is a diagram for explaining an image output processing.

Here, the image output processing, as illustrated in FIG. 6, represents the operation of overwriting the image data D3 into the area 1 to area 24 of the frame memory 20 at 960 fps and thinning out only one frame per every 35 frames to read the frames, and represents the operation of stopping the overwriting of the image data into the frame memory 20 in a case where an external instruction instruct the writing to stop or a high-speed transition scene is detected, to protect the image data D3 of 960 fps stored in the area 1 to area 24.

The image output processing starts, for example, according to the control from the external HOST ISP 30. In STEP S1, the pixel generation unit 16 transfers the image data D1 (10 bits/pixel, the angle of view is 16:9, and the number of pixels is 2 Mpixels) according to incident light to the AD conversion unit 17 at 960 fps. In STEP S2, the AD conversion unit 17 digitally converts the image data D1 transferred from the pixel generation unit 16 to the coded image data D2 (11 bits/pixel, the angle of view is 16:9, and the number of pixels is 2 Mpixels) and transfers the image data D2 to the first signal processing unit 18 at 960 fps.

In STEP S3, the first signal processing unit 18 performs the first signal processing on the image data D2, and at the same time, the scene detection unit 19 detects the high-speed transition scene. In addition, based on the control from the memory control unit 14, the first signal processing unit 18 transfers the image data D3 (10 bits/pixel, the angle of view is 16:9, and the number of pixels is 2 Mpixels) obtained as a result of the first signal processing to the frame memory 20 at 960 fps to be sequentially overwritten into the area 1 to area 24.

In STEP S4, based on the control from the memory control unit 14, the second signal processing unit 21 reads one frame of the image data D4 per every 35 frames of image data D3 overwritten into the area 1 to area 24 of the frame memory 20. That is, the image data D4 is image data in which the frames of the image data D3 are thinned out to ⅕ thereof, and the frame rate at this time is 30 fps. Furthermore, the second signal processing unit 21 performs the second signal processing on the read image data D4 and outputs the image data D5 obtained as a result of the second signal processing to the output I/F 22. The output I/F 22 transfers the image data D5 transferred from the second signal processing unit 21 to the HOST ISP 30 as the image data D6.

In this manner, in the latter stage in the frame memory 20, the operation is performed at 30 fps. Therefore, it is possible to decrease the power consumption to ⅕ thereof compared to the case of operation at 960 fps.

In STEP S5, the memory control unit 14 determines whether or not there is an instruction from the HOST ISP 30 to stop the writing, or there is a notification from the first signal processing unit 18 notifying that the high-speed transition scene is detected, and the process returns to STEP S1 and the processing tasks are repeated thereafter until there is any one of the above-described instruction or notification. In this way, the overwriting of the image data D3 into the area 1 to area 24 of the frame memory 20 at 960 fps and the reading of the image data D4 from the area 1 to area 24 of the frame memory 20 at 30 fps are continued.

In STEP S5, in a case where it is determined that there is any one of the instruction to stop the writing or notification of detection of the high-speed transition scene, the process proceeds to STEP S6. In STEP S6, the memory control unit 14 stops the overwriting of the image data D3 into the area 1 to area 24 of the frame memory 20 immediately or after delaying for a predetermined number of frames (for example, half the number of areas of the frame memory 20 into which the image data D3 is overwritten, in a case of the present embodiment, 12). In this way, 24 frames (0.025 seconds of imaging time) of the image data D3 of 960 fps is held in the area 1 to area 24 of the frame memory 20.

Stopping the overwriting immediately or after a delay for a predetermined number of frames may be set in advance depending on the object to be imaged for which remaining of the image data D3 of 960 fps is intended to be remained.

Figure 7:
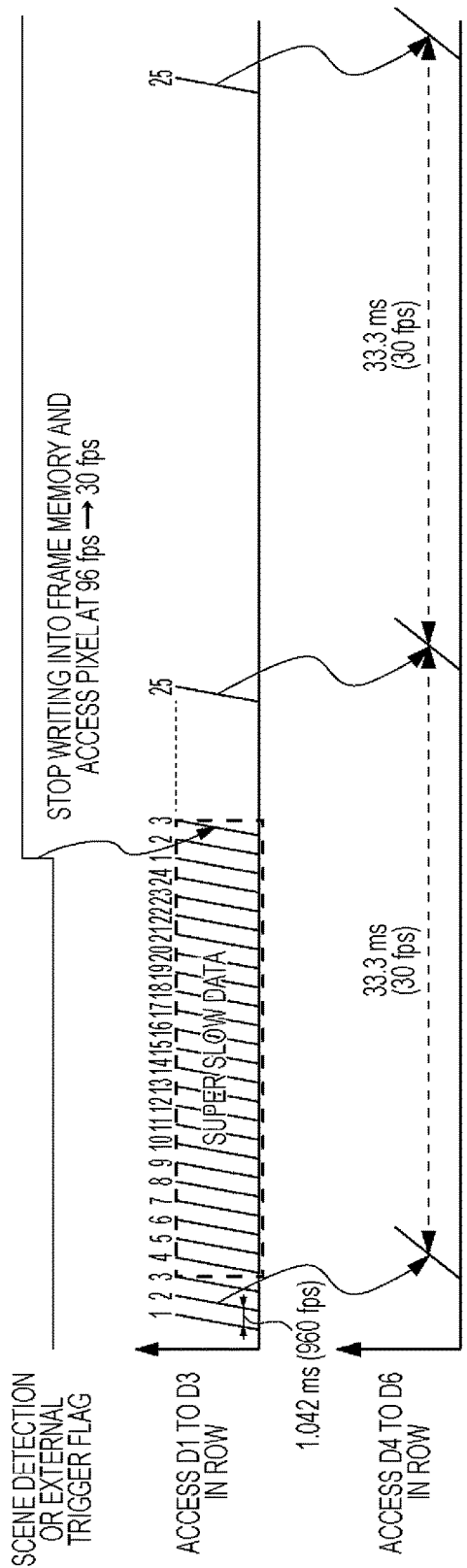
FIG. 7 is a diagram for explaining an image output processing.

For example, in a case where an object to be imaged is a continuing event such as a fountain, the overwriting may be set to stop immediately. In this way, as illustrated in FIG. 7, the image data D3 of 24 frames overwritten until that time is protected.

Figure 8:
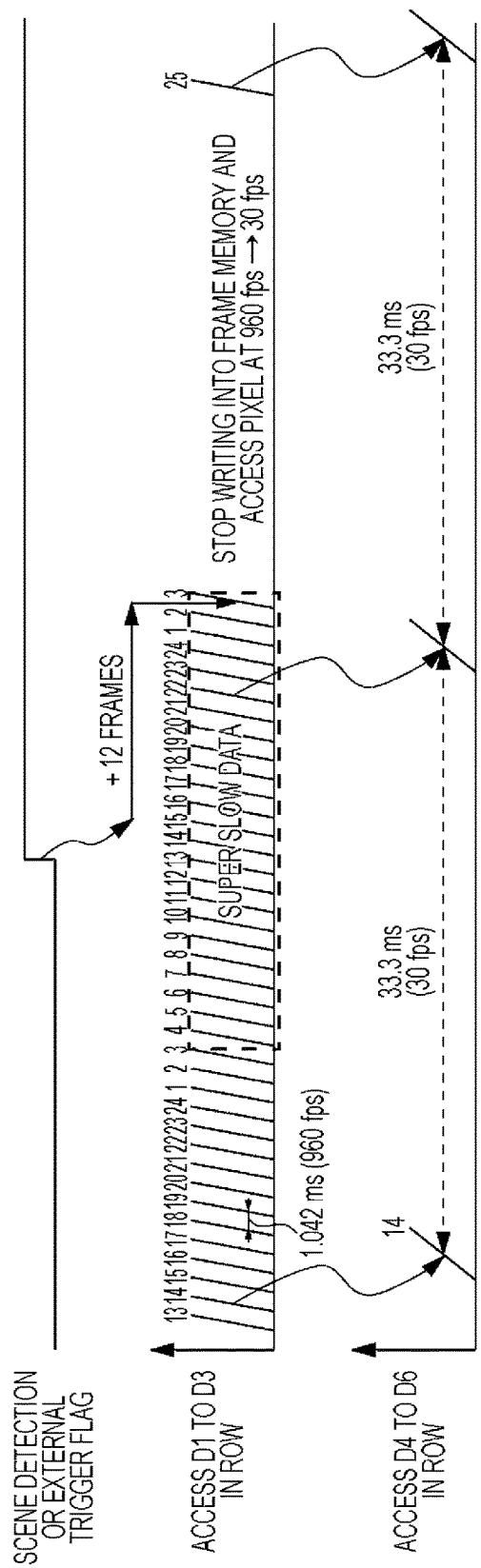
FIG. 8 is a diagram for explaining an image output processing.

In addition, for example, in a case where an object to be imaged is a scene of a moment such as a golf swing or a scene of cracking a water balloon, the overwriting may be set to stop after the delay for a predetermined number of frames from the detection of the high-speed transition scene in such a manner that the image data D3 before and after the moment can be protected. In this way, as illustrated in FIG. 8, the 12 frames of image data D3 written until that time, and the 12 frames of image data D3 written after the detection of the high-speed transition scene are protected. An amount of delaying until the overwriting is stopped is not limited to half the number of areas of the frame memory 20 into which the image data D3 is overwritten, and can be set to any value that is equal to or smaller than the number of areas of the frame memory 20 into which the image data D3 is overwritten.

In this way, after the overwriting of the image data D3 into the area 1 to area 24 of the frame memory 20 is stopped, the process proceeds to STEP S7.

In STEP S7, the pixel generation unit 16 transfers the image data D1 (10 bits/pixel, the angle of view is 16:9, and the number of pixels is 2 Mpixels) according to incident light to the AD conversion unit 17 at 30 fps. In STEP S8, the AD conversion unit 17 digitally converts the image data D1 transferred from the pixel generation unit 16 to the coded image data D2 (11 bits/pixel, the angle of view is 16:9, and the number of pixels is 2 Mpixels) and transfers the image data D2 to the first signal processing unit 18 at 30 fps.

In STEP S9, based on the control from the memory control unit 14, the first signal processing unit 18 performs the first signal processing on the image data D2, and transfers the image data D3 (10 bits/pixel, the angle of view is 16:9, and the number of pixels is 2 Mpixels) obtained as a result of the processing on the frame memory 20 at 30 fps and overwrites the image data D3 into the area 25 thereof.

In STEP S10, based on the control from the memory control unit 14, the second signal processing unit 21 reads one frame of the image data D3 written into the area 25 of the frame memory 20 at 30 fps, performs the second signal processing on the read image data D4, and transfers the image data D5 obtained as a result of the processing to the output I/F 22. The output I/F 22 outputs the image data D5 transferred from the second signal processing unit 21 to the HOST ISP 30 as the image data D6. The transfer rate at this time is approximately 600 Mbps, and generally the I/F 22 has a transfer rate of approximately 4 Gbps. Therefore, it is a sufficient bandwidth for transferring.

Figure 9:
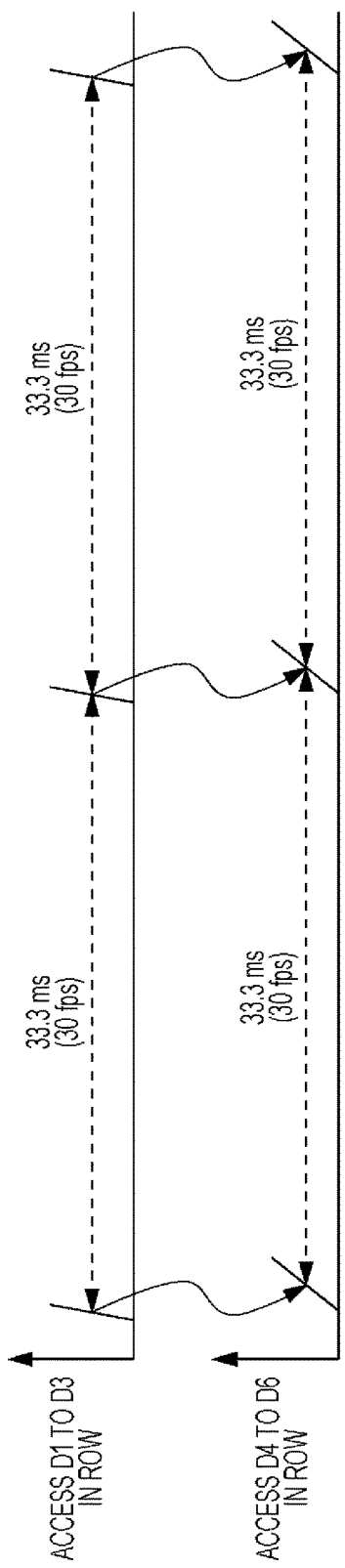
FIG. 9 is a diagram for explaining an image output processing.

That is, in STEPs 7 to 10, as illustrated in FIG. 9, each of a first stage and a latter stage of the frame memory 20 operates at 30 fps respectively. Therefore, it is possible to decrease the power consumption to 1/35 compared to the case of operation at 960 fps. As above, the image output processing is completed.

<Reading a Super Slow Moving Picture>

Next, reading of the image data D3 of 24 frames of 960 fps protected in the area 1 to area 24 of the frame memory 20 will be described.

Figure 10:
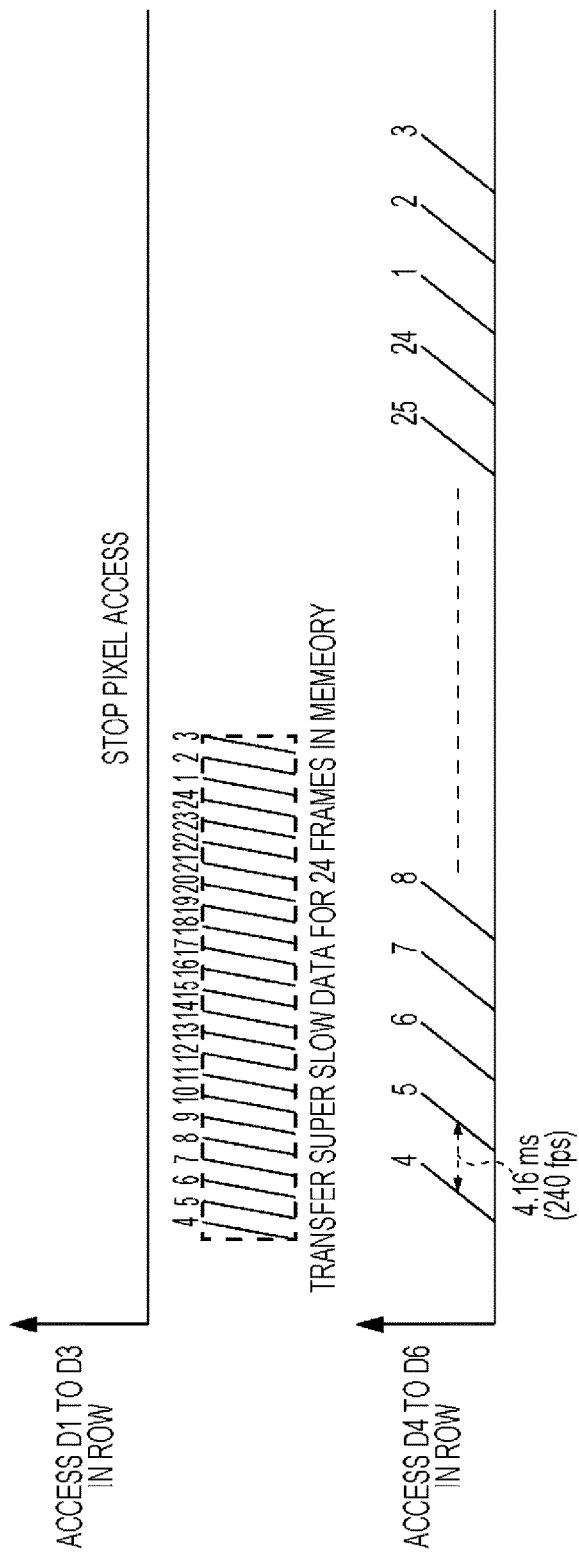
FIG. 10 is a diagram for explaining a method of outputting image data protected in a frame memory.

FIG. 10 illustrates, in a state where the first stage of the frame memory 20 is stopped, an example of a case of reading only the image data D3 of 24 frames of 960 fps protected in the area 1 to area 24 of the frame memory 20.

In this case, it is possible to read the image data D3 of 24 frames at an arbitrary frame rate equal to or lower than the frame rate at which the latter stage of the frame memory 20 can operate. In the example in FIG. 10, an example of reading the image data D3 at 240 fps is illustrated.

Figure 11:
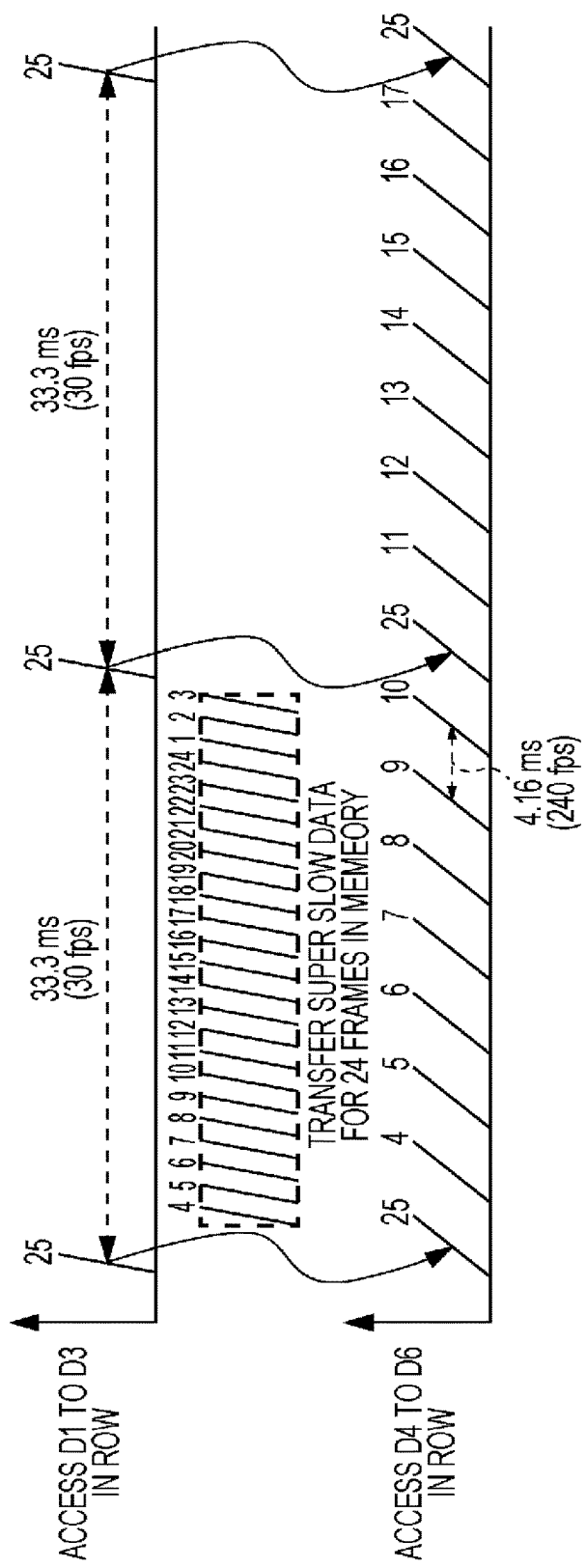
FIG. 11 is a diagram for explaining a method of outputting image data protected in a frame memory.

FIG. 11 illustrates an example of a case of reading the image data D3 of 24 frames of 960 fps protected in the area 1 to area 24 of the frame memory 20 subsequent to STEP S10 of the image output processing described above.

In this case, it is possible to read the image data D3 of 24 frames while the image data D4 from the area 25 of the frame memory 20 is read at 30 fps. FIG. 11 illustrates an example of reading the image data including the data in the area 25 at 240 fps.

If the image data D3 of 24 frames of 960 fps protected in the area 1 to area 24 of the frame memory 20 is replayed at, for example, 30 fps, it is possible to display the image data as a super slow moving picture of an imaging time of 0.025 seconds in which a decisive moment is captured.

<Application of the Imaging Device which is Described in the Present Embodiment>

The imaging device according to the present embodiment can be applied to, for example, a portable compact imaging apparatus such as a wearable camera or an electronic apparatus having an imaging function.

With the wearable camera put in a normal video-recording stand-by mode (overwriting the image data D3 with respect to the area 1 to area 24 of the frame memory 20), even in a case where the recording is triggered after the user thinks to start imaging, it is possible to use the wearable camera in such a manner that the image data of a few seconds before the triggering can be recorded.

Figure 12:
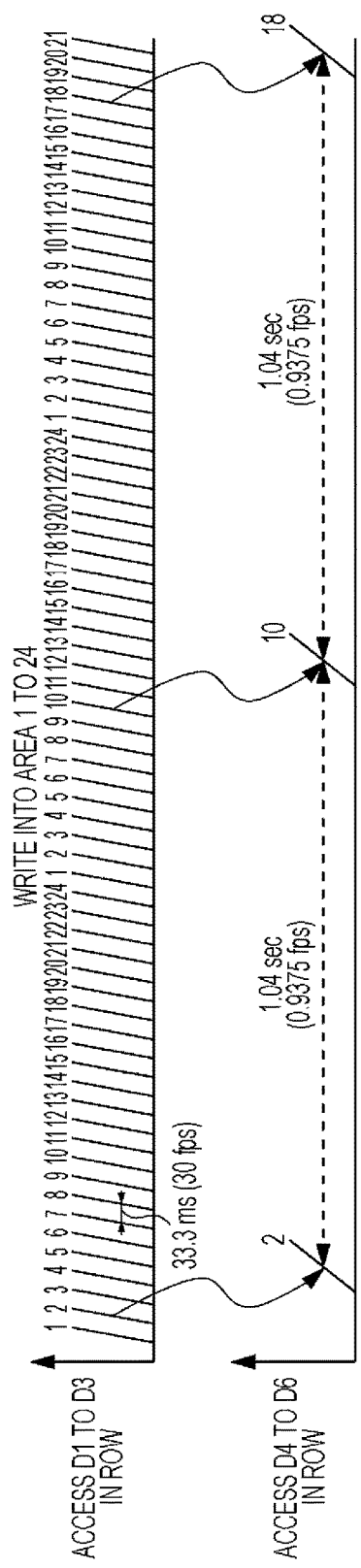
FIG. 12 is a diagram for explaining an application example of an image output processing.

Specifically, for example, as illustrated in FIG. 12, by causing the first stage of the frame memory 20 to operate at 30 fps and by increasing the thinning rate in reading the data from the frame memory 20 significantly, the latter stage of the frame memory 20 operates at an extremely low frame rate. The thinning rate at this time may be a level sufficient to allow feedback of AE, AF, and AWB based on the output image data D6. Specifically, it may be approximately 0.9375 fps in which one frame is output in a few seconds.

In this way, in a case where the latter stage of the frame memory 20 is operated at an extremely low frame rate, it is possible to decrease the power consumption significantly compared to the case of operation at a normal 30 fps.

<Interleaved Driving of the Frame Memory 20>

As described above with reference to FIG. 3, in a case where the encoder 41 is added to the first signal processing unit 18 of the imaging device 10 and the decoder 42 is added to the second signal processing unit 21, the amount of data of the image data D3 (image data D4) that is written into the frame memory 20 can be reduced, and thus, it is possible to increase the number of frames of the image data D3 that can be held in the frame memory 20 without increasing the capacity of the frame memory 20.

For example, in a case where the image data D3 is compression encoded such that the amount of data thereof becomes one half in the encoder 41, the number of frames that can be held in the frame memory 20 can be doubled. That is, compared to the case in FIGS. 2A to 2C, as many as 50 frames which is twice as many can be held.

In a case where 50 frames of image data D3 can be held in the frame memory 20, if the above-described image output processing is performed, 49 frames of image data D3 of 960 fps can be held in the frame memory 20.

Alternatively, in a case where 50 frames of image data D3 can be held in the frame memory 20, the frame memory 20 may be divided into two memory banks, and those two memory banks may be driven in interleaved driving.

Figure 13:
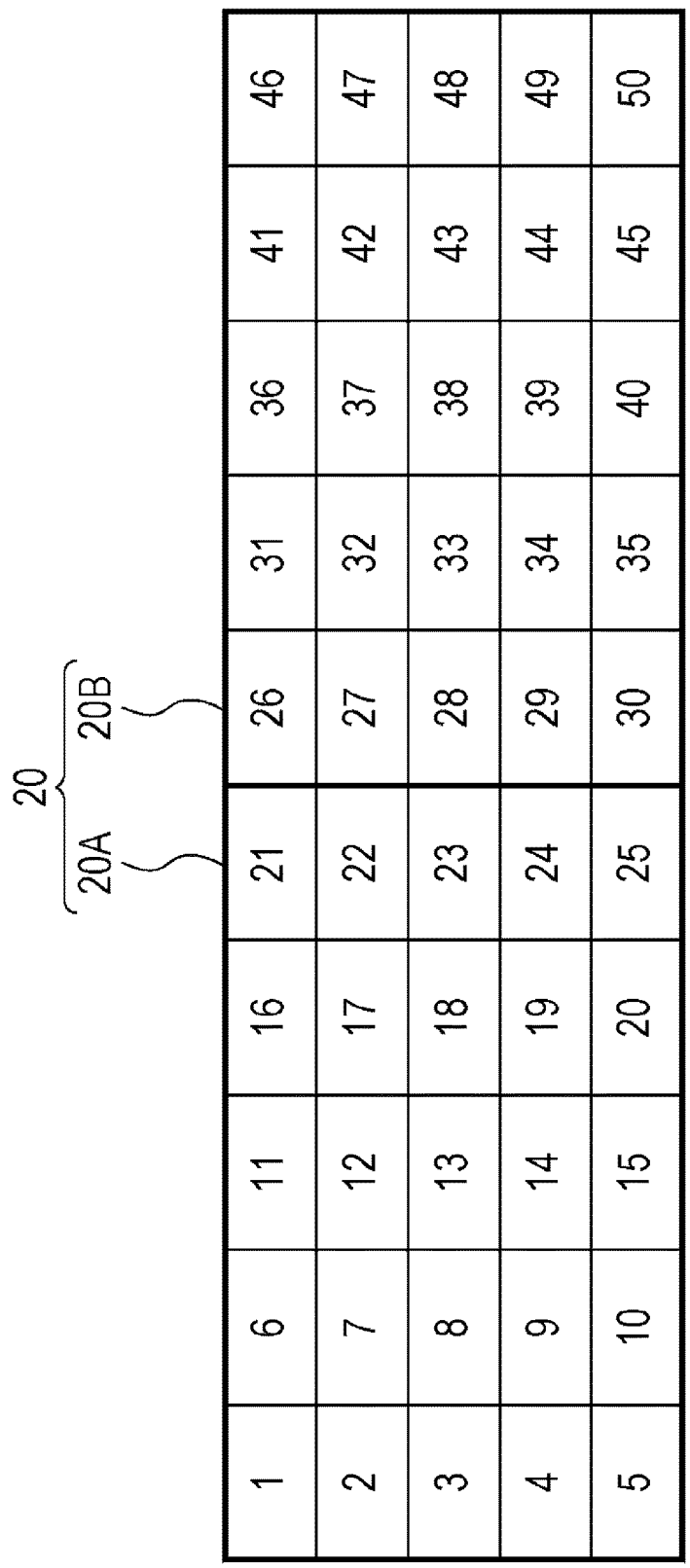
FIG. 13 is a diagram for explaining a case of driving a frame memory in interleaved driving.

FIG. 13 illustrates a case where the frame memory 20 is divided into a first memory bank 20A having area 1 to area 25 and a second memory bank 20B having area 26 to area 50.

In the description of operation above, until all of the image data D3 of 960 fps held in the frame memory 20 has been read, new image output processing is difficult to be started. However, by driving the first memory bank 20A and the second memory bank 20B of the frame memory 20 in interleaved driving, new image output processing can be started without waiting for the reading of all of the image data D3 of 960 fps held in the frame memory 20. In other words, it is possible to continuously image a super slow moving picture without interruptions.

Even in a case where the image data D3 written into the frame memory 20 is not compression encoded, if the capacity of the frame memory 20 is increased and is driven in interleaved driving, it is possible to obtain the above-described effects.

<Configuration Example of Imaging Device in the Second Embodiment of the Present Disclosure>

Figure 14:
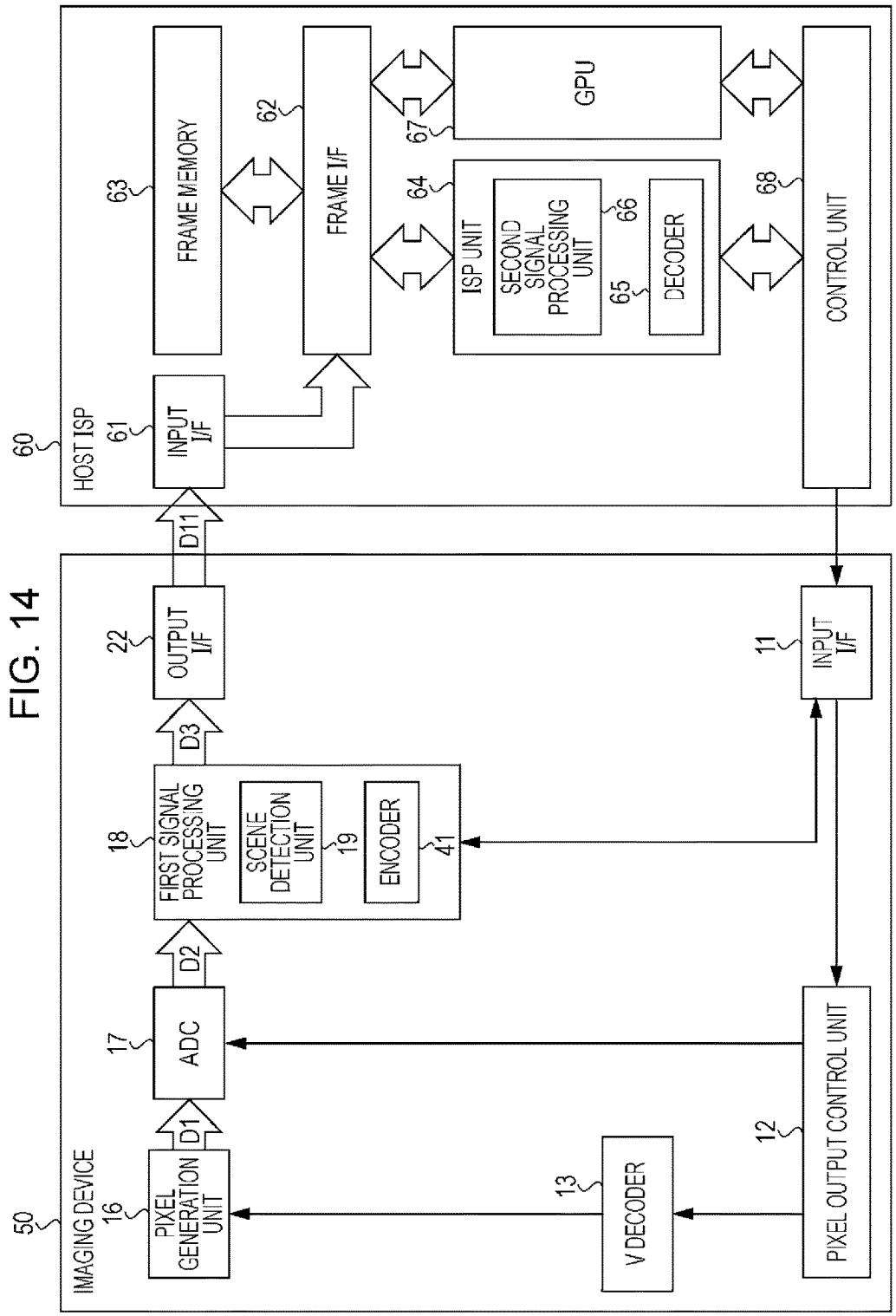
FIG. 14 is a block diagram illustrating another configuration example of an imaging device to which the present disclosure is applied.

FIG. 14 illustrates a configuration example of an imaging device according to a second embodiment of the present disclosure. This imaging device is mounted on an electronic apparatus which includes an imaging function such as a digital camera and the like, and is formed from an imaging device 50 and a HOST ISP 60.

The second embodiment illustrated in FIG. 14 is different from the first embodiment illustrated in FIG. 1 or FIG. 3 in the point that the frame memory and the second signal processing unit are not provided on the imaging device but provided on the HOST ISP. The configuration elements in the second embodiment illustrated in FIG. 14 that are the same as the configuration elements in the first embodiment illustrated in FIG. 1 or FIG. 3 are referred to by the same reference signs, and the description thereof will not be repeated.

The imaging device 50 images a moving picture at a high frame rate according to a request from the HOST ISP 60 and performs a compression encoding of the image data thereof, and then, outputs the encoded data to the HOST ISP 60 in frame units. The HOST ISP 60 performs the ISP processing on the image data of the moving picture input from the imaging device 50, and performs a predetermined image processing, and then, outputs the image data obtained as a result to the next stage.

The imaging device 50 includes an input I/F 11, a pixel output control unit 12, a V decoder 13, a pixel generation unit 16, an AD conversion unit (ADC) 17, a first signal processing unit 18, and an output I/F 22. The first signal processing unit 18 incorporates a scene detection unit 19 and an encoder 41.

In the imaging device 50, the image data D1 is output from the pixel generation unit 16 to the AD conversion unit 17 at 960 fps, and is converted in the AD conversion unit 17 to the image data D2 which is a digital signal, and then, transferred to the first signal processing unit 18. The compression encoding is performed on the transferred image data D2 by the encoder 41 after the first signal processing by the first signal processing unit 18, the image data D3 of which an amount of data is reduced obtained as a result thereof is transferred to the output I/F 22. The transferred image data D3 of 960 fps is output from the output I/F 22 to the HOST ISP 60 as image data D11. The result of the detection of the high-speed transition scene by the scene detection unit 19 of the first signal processing unit 18 is notified to a control unit 68 of the HOST ISP 60 via the input I/F 11.

The HOST ISP 60 includes an input I/F 61, a memory I/F 62, a frame memory 63, an ISP unit 64, a GPU 67, and the control unit 68. The ISP unit 64 incorporates a decoder 65 and a second signal processing unit 66.

The input I/F 61 transfers the compression encoded image data D11 input from the imaging device 50 to the frame memory 63 via the memory I/F 62. The frame memory 63 is formed from, for example, a highly integrated and high-speed access memory such as a DRAM or a spin-RAM, and has a capacity in which at least a plurality of frames (for example, for 25 frames formed from the area 1 to area 25 as in the case of the first embodiment) of compression encoded image data D11 can be held.

The ISP unit 64 reads the compression encoded image data D11 from the frame memory 63 via the memory OF 62 based on the control by the control unit 68, performs the second signal processing and the ISP processing after the decoding, and outputs image data D12 obtained as a result thereof to the GPU 67 via the memory OF 62. The GPU 67 performs a predetermined image processing on the image data D12 from the ISP unit 64 based on the control by the control unit 68.

In the HOST ISP 60, the compression encoded image data D11 of 960 fps input from the imaging device 50 is transferred to the frame memory 63 from the input I/F 61 via the memory OF 62, and then, is sequentially overwritten into the area 1 to area 24. Then, until there is an instruction to stop the writing or a notification for the detection of a high-speed transition scene, the image data D11 overwritten into the frame memory 63 is read out by thinning out only one frame by the ISP unit 64 per every 35 frames, the decoding processing, the second signal processing, and the ISP processing are performed thereon, and a predetermined image processing is performed by the GPU 67.

In a case where there is an instruction to stop the writing or a notification for the detection of a high-speed transition scene, the overwriting of the image data D11 into the frame memory 63 is stopped. Accordingly, similarly to the case in the first embodiment, the image data D11 of 960 fps can be held in the frame memory 63. The timing of reading out the image data D11 of 960 fps held in the frame memory 63 may be the same as that in the first embodiment. Alternatively, as described referring to FIG. 13, by dividing the frame memory 63 into a plurality of memory banks and by driving the frame memory in interleaved driving, the imaging of a super slow moving picture may be continuously performed without interruptions.

According to the second embodiment illustrated in FIG. 14, it is possible to reduce the amount of data of the image data D11 output to the HOST ISP 60 from the imaging device 50 at 960 fps compared to the case where the compression encoding is not performed. Therefore, it is possible to reduce the bandwidth between imaging device 50 and the HOST ISP 60 compared to the case where the compression encoding is not performed.

In addition, it is possible to move the second signal processing unit 66 of which the processing load is relatively large and the power consumption is relatively high, to the outside of the imaging device 50.

<Configuration Example of Imaging Device in the Third Embodiment of the Present Disclosure>

Figure 15:
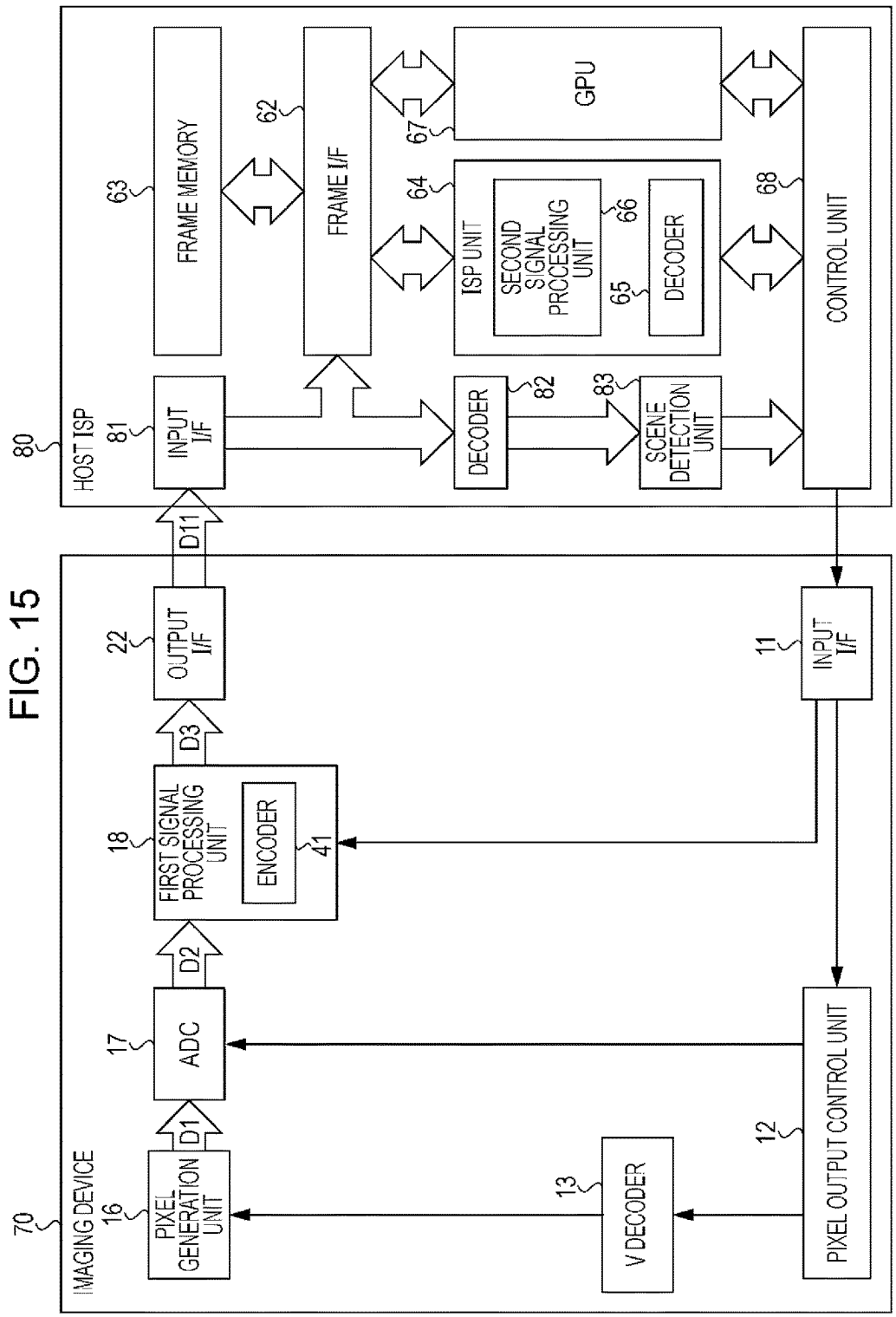
FIG. 15 is a block diagram illustrating still another configuration example of an imaging device to which the present disclosure is applied.

Next, FIG. 15 illustrates a configuration example of an imaging device according to a third embodiment of the present disclosure. This imaging device is mounted on an electronic apparatus which includes an imaging function such as a digital camera and the like, and is formed from an imaging device 70 and a HOST ISP 80.

The third embodiment illustrated in FIG. 15 is different from the second embodiment illustrated in FIG. 14 in the point that the scene detection unit is not provided on the imaging device but provided on the HOST ISP. The configuration elements in the third embodiment illustrated in FIG. 15 that are common to the configuration elements in the second embodiment illustrated in FIG. 14 are referred to by the same reference signs, and the description thereof will not be repeated.

The imaging device 70 images a moving picture at a high frame rate according to a request from the HOST ISP 80 and performs a compression encoding of the image data thereof, and then, outputs the encoded data to the HOST ISP 80 in a frame unit. The HOST ISP 80 performs the ISP processing on the image data of the moving picture input from the imaging device 70, and performs a predetermined image processing, and then, outputs the image data obtained as a result to the next stage.

The imaging device 70 includes an input I/F 11, a pixel output control unit 12, a V decoder 13, a pixel generation unit 16, an AD conversion unit (ADC) 17, a first signal processing unit 18, and an output I/F 22. The first signal processing unit 18 incorporates an encoder 41.

In the imaging device 70, the image data D1 is output from the pixel generation unit 16 to the AD conversion unit 17 at 960 fps, and is converted in the AD conversion unit 17 to the image data D2 which is a digital signal, and then, transferred to the first signal processing unit 18. The compression encoding is performed on the transferred image data D2 by the encoder 41 after the first signal processing by the first signal processing unit 18, the image data D3 of which an amount of data is reduced obtained as a result thereof is transferred to the output I/F 22. The transferred image data D3 of 960 fps is output from the output I/F 22 to the HOST ISP 80 as image data D11.

The HOST ISP 80 includes an input I/F 81, a memory I/F 62, a frame memory 63, an ISP unit 64, a GPU 67, a control unit 68, a decoder 82, and a scene detection unit 83. The ISP unit 64 incorporates a decoder 65 and a second signal processing unit 66.

The input I/F 81 transfers the compression encoded image data D11 input from the imaging device 70 to the frame memory 63 via the memory I/F 62. In addition, the input I/F 81 transfers the compression encoded image data D11 input from the imaging device 70 to the decoder 82.

The decoder 82 decodes the compression encoded image data D11 and supplies the compression encoded image data D11 to the scene detection unit 83. In a case where a high-speed transition scene is detected from the decoded image data, the scene detection unit 83 notifies the control unit 68 of that fact.

In the HOST ISP 80, the compression encoded image data D11 of 960 fps input from the imaging device 70 is transferred to the frame memory 63 from the input I/F 81 via the memory OF 62, and then, is sequentially overwritten into the area 1 to area 24. In addition, the image data D11 is transferred to the decoder 82 from the input OF 81, and the detection of a high-speed transition scene is performed by the scene detection unit 83 after the decoding.

Then, until there is an instruction to stop the writing or a notification for the detection of a high-speed transition scene, the image data D11 overwritten into the frame memory 63 is read out by thinning out only one frame by the ISP unit 64 per every 35 frames, the decoding processing, the second signal processing, and the ISP processing are performed thereon, and a predetermined image processing is performed by the GPU 67.

In a case where there is an instruction to stop the writing or a notification for the detection of a high-speed transition scene, the overwriting of the image data D11 into the frame memory 63 is stopped. Accordingly, as similar to the case in the second embodiment, the image data D11 of 960 fps can be held in the frame memory 63. The timing of reading out the image data D11 of 960 fps held in the frame memory 63 may be the same as that in the second embodiment. Alternatively, as described referring to FIG. 13, by dividing the frame memory 63 into a plurality of memory banks and by driving the frame memory in interleaved driving, the imaging of a super slow moving picture may be continuously performed without interruptions.

According to the third embodiment illustrated in FIG. 15, it is possible to reduce the amount of data of the image data D11 output to the HOST ISP 80 from the imaging device 70 at 960 fps compared to the case where the compression encoding is not performed. Therefore, it is possible to reduce the bandwidth between imaging device 70 and the HOST ISP 80 compared to the case where the compression encoding is not performed.

In addition, it is possible to move the second signal processing unit 66 of which the processing load is relatively large and the power consumption is relatively high, to the outside of the imaging device 70.

<Configuration Example of Imaging Device in the Fourth Embodiment of the Present Disclosure>

Figure 16:
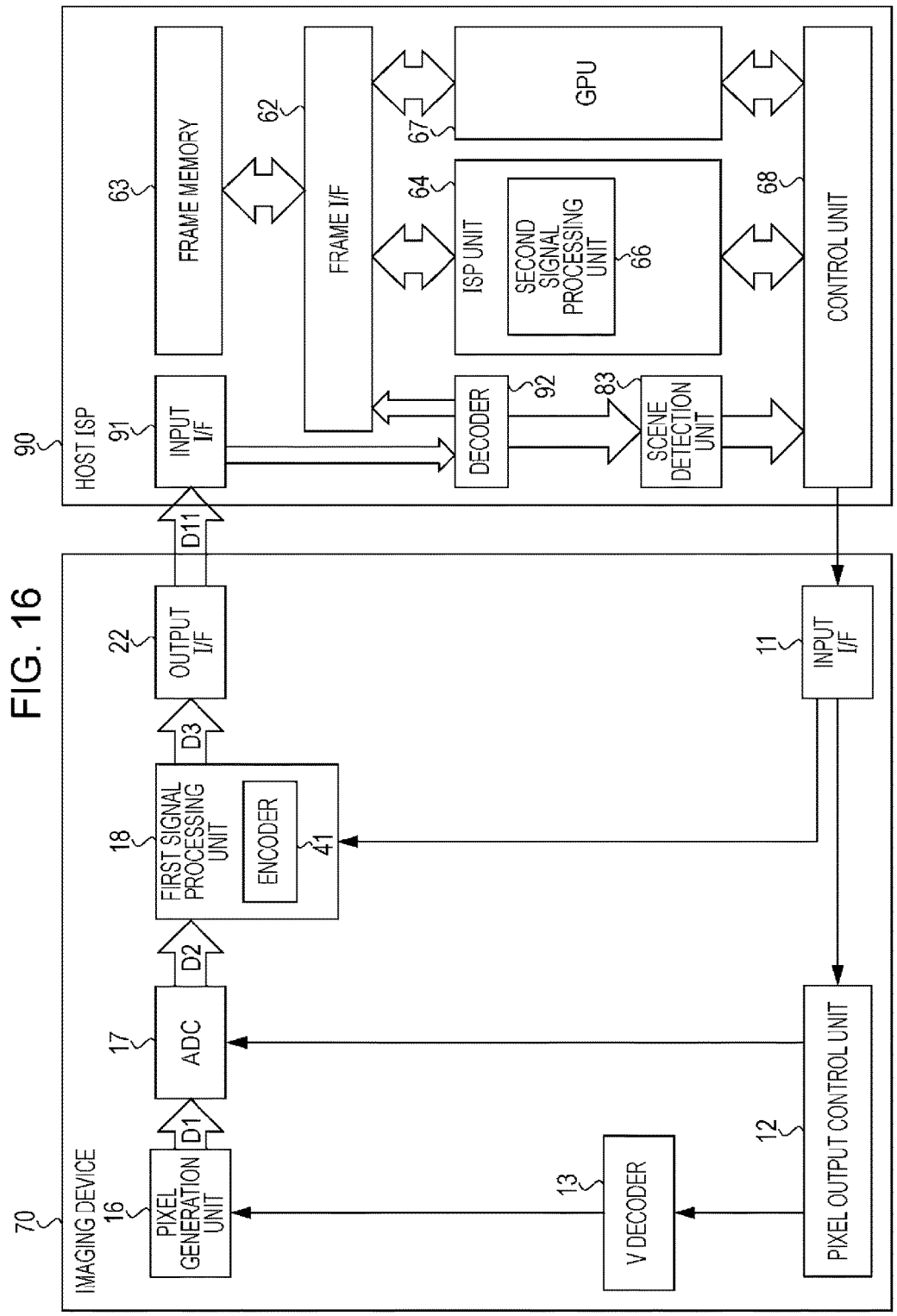
FIG. 16 is a block diagram illustrating still another configuration example of an imaging device to which the present disclosure is applied.

Next, FIG. 16 illustrates a configuration example of an imaging device according to a fourth embodiment of the present disclosure. This imaging device is mounted on an electronic apparatus which includes an imaging function such as a digital camera and the like, and is formed from an imaging device 70 and a HOST ISP 90.

In the fourth embodiment illustrated in FIG. 16, the imaging device 70 is common and the HOST ISP 80 is replaced by a HOST ISP 90 compared to the third embodiment illustrated in FIG. 15. The configuration elements in the fourth embodiment illustrated in FIG. 16 that are common to the configuration elements in the third embodiment illustrated in FIG. 15 are referred to by the same reference signs, and the description thereof will not be repeated.

The HOST ISP 90 includes an input I/F 91, a memory I/F 62, a frame memory 63, an ISP unit 64, a GPU 67, a control unit 68, a decoder 92, and a scene detection unit 83. The ISP unit 64 incorporates a decoder 65 and a second signal processing unit 66.

The input I/F 91 transfers the compression encoded image data D11 input from the imaging device 70 to the decoder 92. The decoder 92 decodes the compression encoded image data D11 and transfers image data 21 obtained from the result thereof to the frame memory 63 via the memory I/F 62, and supplies the result to the scene detection unit 83.

In a case where a high-speed transition scene is detected from the decoding completed image data D21, the scene detection unit 83 notifies the control unit 68 of that fact.

In the HOST ISP 90, the image data D21 to which the compression encoded image data D11 of 960 fps input from the imaging device 70 is decoded is transferred to the frame memory 63, and then, is sequentially overwritten into the area 1 to area 24. In addition, the detection of a high-speed transition scene is performed from the image data D21.

Then, until there is an instruction to stop the writing or a notification for the detection of a high-speed transition scene, the image data D21 written into the frame memory 63 is read out by thinning out only one frame by the ISP unit 64 per every 35 frames, the second signal processing, and the ISP processing are performed thereon, and a predetermined image processing is performed by the GPU 67.

In a case where there is an instruction to stop the writing or a notification for the detection of a high-speed transition scene, the overwriting of the image data D21 into the frame memory 63 is stopped. Accordingly, as similar to the case in the second embodiment, the image data D21 of 960 fps can be held in the frame memory 63. The timing of reading out the image data D21 of 960 fps held in the frame memory 63 may be the same as that in the third embodiment.

According to the fourth embodiment illustrated in FIG. 16, it is possible to reduce the amount of data of the image data D11 output to the HOST ISP 90 from the imaging device 70 at 960 fps compared to the case where the compression encoding is not performed. Therefore, it is possible to reduce the bandwidth between imaging device 70 and the HOST ISP 80 compared to the case where the compression encoding is not performed.

In addition, it is possible to move the second signal processing unit 66 of which the processing load is relatively large and the power consumption is relatively high, to the outside of the imaging device 70.

However, since the image data D21 written into the frame memory 63 is decoded from the compression encoded state, the number of frames that can be held in the frame memory 63 is reduced compared to the case of the second and third embodiments.

<Configuration Example of Imaging Device in the Fifth Embodiment of the Present Disclosure>

Figure 17:
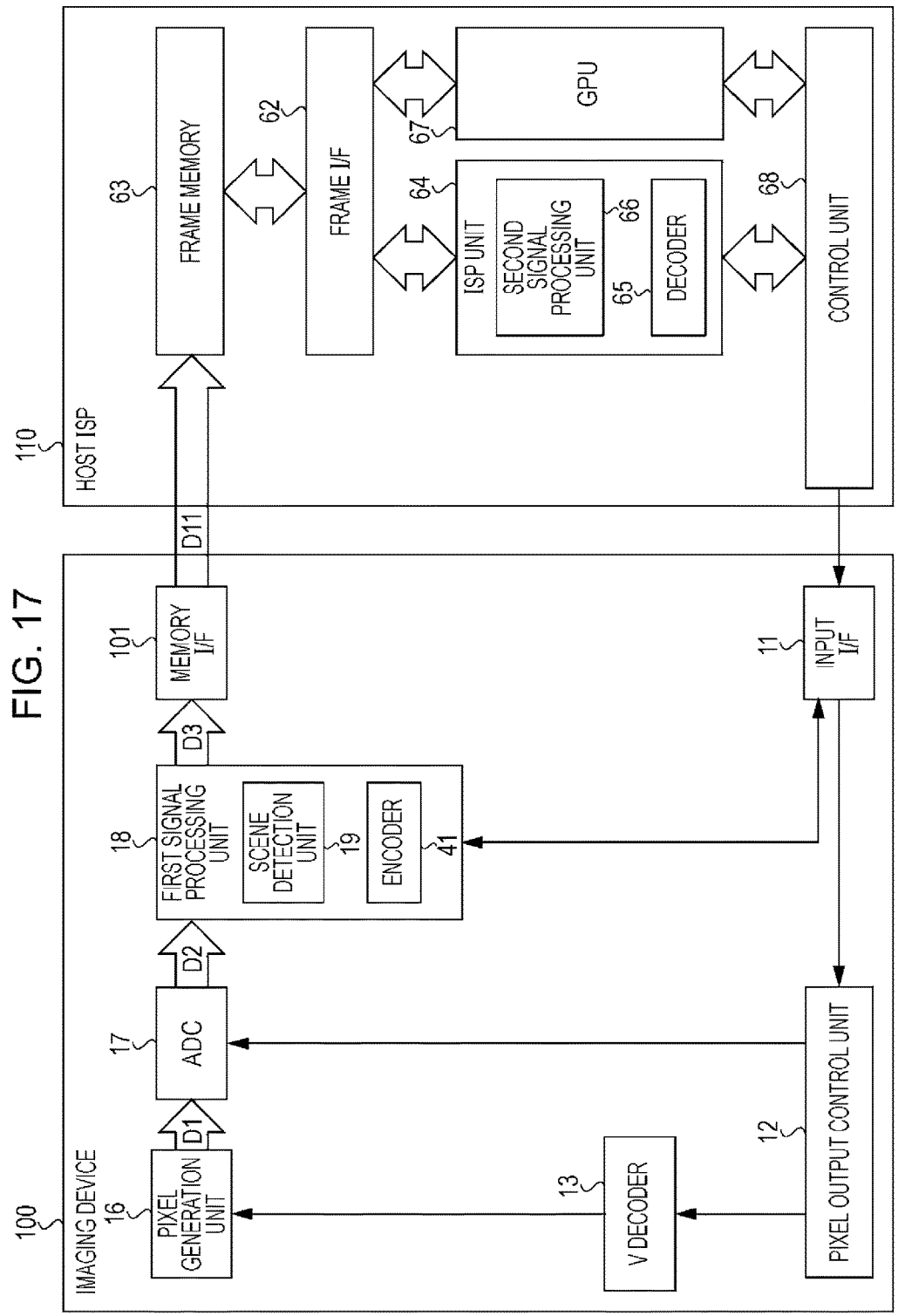
FIG. 17 is a block diagram illustrating still another configuration example of an imaging device to which the present disclosure is applied.

Next, FIG. 17 illustrates a configuration example of an imaging device according to a fifth embodiment of the present disclosure. This imaging device is mounted on an electronic apparatus which includes an imaging function such as a digital camera and the like, and is formed from an imaging device 100 and a HOST ISP 110.

In the fifth embodiment illustrated in FIG. 17, the output I/F 22 of the imaging device is replaced by the memory I/F 101 and the input I/F 61 is removed from the HOST ISP compared to the second embodiment illustrated in FIG. 14. The configuration elements in the fifth embodiment illustrated in FIG. 17 that are common to the configuration elements in the second embodiment illustrated in FIG. 14 are referred to by the same reference signs, and the description thereof will not be repeated.

That is, the imaging device 100 includes an input I/F 11, a pixel output control unit 12, a V decoder 13, a pixel generation unit 16, an AD conversion unit (ADC) 17, a first signal processing unit 18, and a memory I/F 101. The first signal processing unit 18 incorporates a scene detection unit 19 and an encoder 41.

In the imaging device 100, the image data D1 is output from the pixel generation unit 16 to the AD conversion unit 17 at 960 fps, and is converted in the AD conversion unit 17 to the image data D2 which is a digital signal, and then, transferred to the first signal processing unit 18. The compression encoding is performed on the transferred image data D2 by the encoder 41 after the first signal processing by the first signal processing unit 18, the image data D3 of which an amount of data is reduced is transferred to the memory I/F 101, and is transferred to the frame memory 63 of the HOST ISP 110 as the image data D11 by the memory I/F 101 and sequentially overwritten into the area 1 to area 24.

The HOST ISP 110 includes a memory I/F 62, a frame memory 63, an ISP unit 64, a GPU 67, and a control unit 68. The ISP unit 64 incorporates a decoder 65 and a second signal processing unit 66.

In the HOST ISP 110, the image data D11 of 960 fps is directly and sequentially overwritten into the area 1 to area 24 of the frame memory 63 from the memory I/F 101 of the imaging device 100. Then, until there is an instruction to stop the writing or a notification for the detection of a high-speed transition scene, the image data D11 written into the frame memory 63 is read out by thinning out only one frame by the ISP unit 64 per every 35 frames, the decoding processing, the second signal processing, and the ISP processing are performed thereon, and a predetermined image processing is performed by the GPU 67.

In a case where there is an instruction to stop the writing or a notification for the detection of a high-speed transition scene, the overwriting of the image data D11 into the frame memory 63 is stopped. Accordingly, as similar to the case in the first embodiment, the image data D11 of 960 fps can be held in the frame memory 63. The timing of reading out the image data D11 of 960 fps held in the frame memory 63 may be the same as that in the first embodiment. Alternatively, as described referring to FIG. 13, by dividing the frame memory 63 into a plurality of memory banks and by driving the frame memory in interleaved driving, the imaging of a super slow moving picture may be continuously performed without interruptions.

According to the fifth embodiment illustrated in FIG. 17, it is possible to reduce the amount of data of the image data D11 output to the HOST ISP 110 from the imaging device 100 at 960 fps compared to the case where the compression encoding is not performed. Therefore, it is possible to reduce the bandwidth between imaging device 100 and the HOST ISP 110 compared to the case where the compression encoding is not performed.

In addition, it is possible to move the second signal processing unit 66 of which the processing load is relatively large and the power consumption is relatively high, to the outside of the imaging device 100.

As described above, if the imaging device according to the present embodiment is applied, even a commoditized inexpensive camera system can easily image a super slow moving picture with low resolution-degradation using lower power consumption, or a time-shift image using extremely low power consumption.

The embodiment of the present disclosure is not limited to the embodiment described above, and various modifications can be made within the scope of the present disclosure.

The present disclosure may have a configuration as described below.

(A1) An imaging device including: a pixel generation unit that generates an image signal formed from a plurality of pixel signals according to incident light; and a frame memory that stores the image signal of a plurality of frames.

(A2) The imaging device according to above (A1), further including: a writing unit that writes the generated image data into the frame memory; and a reading unit that reads the image data written into the frame memory.

(A3) The imaging device according to above (A2) in which the writing unit overwrites the generated image data into a first area of the frame memory; and the reading unit thins out and reads the image data overwritten into the first area of the frame memory in a frame unit.

(A4) The imaging device according to any one of above (A1) to (A3), further including: an encoding unit that encodes the image data written into the frame memory; and a decoding unit that decodes the coded image data read from the frame memory.

(A5) The imaging device according to above (A3), further including: a control unit that, according to a trigger, controls the writing unit and causes the overwriting of the generated image data into the first area of the frame memory to stop.

(A6) The imaging device according to above (A5), in which, the control unit according to the trigger, controls the writing unit immediately or after a delay for a predetermined number of frames, and causes the overwriting of the generated image data into the first area of the frame memory to stop.

(A7) The imaging device according to above (A5), in which, by an instruction from the outside as the trigger, the control unit controls the writing unit and causes the overwriting of the generated image data into the first area of the frame memory to stop.

(A8) The imaging device according to any one of above (A5) to (A7), further including: a detection unit that detects a high-speed transition scene in the image data overwritten into the first area of the frame memory. By the detection of the high-speed transition scene as the trigger, the control unit controls the writing unit, and causes the overwriting of the generated image data into the first area of the frame memory to stop.

(A9) The imaging device according to any one of above (A3) to (A8), in which the reading unit reads the imaged data remaining in the first area of the frame memory due to the stopping of the overwriting.

(A10) The imaging device according to above (A7), in which the writing unit writes the generated image data into a second area of the frame memory after the overwriting is stopped, and the reading unit reads the image data written into the second area of the frame memory, and further reads the image data remaining in the first area of the frame memory due to the stopping of the overwriting.

(A11) The imaging device according to above (A1) to (A10), in which the pixel generation unit performs at least one of changing an angle of view of the generated image data or adding the pixel signals.

(A12) The imaging device according to above (A1) to (A11), in which the imaging devices are disposed on one or a plurality of substrates and are formed in a single chip.

(A13) An imaging apparatus on which an imaging device is mounted. The imaging device includes a pixel generation unit that generates an image signal formed from a plurality of pixel signals according to incident light, and a frame memory that stores the image signal of a plurality of frames.

(A14) An electronic apparatus on which an imaging device is mounted. The imaging device includes a pixel generation unit that generates an image signal formed from a plurality of pixel signals according to incident light, and a frame memory that stores the image signal of a plurality of frames.

(B1) An imaging device, comprising: a pixel generation unit that generates an image signal formed from a plurality of pixel signals according to incident light; a frame memory that stores the image signal of a plurality of frames.

(B2) The imaging device according to above (B1), further comprising: a writing unit, wherein the writing unit writes the image signal to the frame memory at a first frame rate; and a reading unit, wherein the reading unit reads the image data written into the frame memory.

(B3) The imaging device according to above (B2), wherein the writing unit overwrites a previously written frame of generated image data in at least a first area of the frame memory, wherein in a first mode of operation the reading unit reads the image data from the frame memory at a second frame rate, and wherein in the first mode of operation the reading unit reads less than all of the frames of image data stored in the frame memory.

(B4) The imaging device according to above (B2), further comprising: an encoding unit that encodes the image data written into the frame memory; and a decoding unit that decodes the coded image data read from the frame memory.

(B5) The imaging device according to above (B3), further comprising: a control unit, wherein the control unit controls the writing unit and causes the overwriting of the generated image data into the at least a first area of the frame memory to stop in response to the control unit receiving a trigger signal.

(B6) The imaging device according to above (B5), wherein the writing unit stops overwriting of the generated image data into the at least a first area of memory one of immediately after receiving a signal from the control unit or after a delay of a predetermined number of frames after receiving a signal from the control unit.

(B7) The imaging device according to above (B5), wherein the trigger signal is an indication that a high speed transition scene has been detected, and wherein the trigger signal is provided from a source outside of the imaging device.

(B8) The imaging device according to above (B5), further comprising: a detection unit that detects a high-speed transition scene in the image data overwritten into the at least a first area of the frame memory, wherein, by the detection of the high-speed transition scene as the trigger signal, the control unit controls the writing unit and causes the overwriting of the generated image data into the first area of the frame memory to stop.

(B9) The imaging device according to above (B5), wherein after the overwriting of the image data to the at least a first area of the frame memory has stopped, the reading unit reads the image data remaining in the at least a first area of the frame memory.

(B10) The imaging device according to above (B5), wherein after the overwriting of the image data to the at least a first area of the frame memory has stopped, the writing unit writes image data to a reserved area of the frame memory.

(B11) The imaging device according to above (B10), wherein after the overwriting of the image data to the at least a first area of the frame memory has stopped, the reading unit reads image data from the reserved area of the frame memory.

(B12) The imaging device according to above (B10), wherein after the overwriting of the image data to the at least a first area of the frame memory has stopped, the reading unit reads image data from the first area of the frame memory and from the reserved area of the frame memory.

(B13) The imaging device according to above (B12), wherein the reading unit reads image data from the first area of the frame memory and from the reserved area of the frame memory at a rate that is less than the first frame rate and greater than the second frame rate.

(B14) The imaging device according to above (B7), wherein the writing unit writes the generated image data into a second area of the frame memory after the overwriting is stopped, and wherein the reading unit reads the image data written into the second area of the frame memory and further reads the image data remaining in the first area of the frame memory after the overwriting is stopped.

(B15) The imaging device according to above (B2), wherein the pixel generation unit performs at least one of changing an angle of view of the generated image data or adding the pixel signals.

(B16) The imaging device according to above (B2), wherein the pixel generation unit, the frame memory, the writing unit, and the reading unit are disposed on one substrate and are formed in a single chip.

(B17) The imaging device according to above (B2), wherein the pixel generation unit, the frame memory, the writing unit, and the reading unit are disposed on a plurality of substrates and are formed in a single chip.

(B18) The imaging device according to above (B2), wherein the pixel generation unit, the frame memory, the writing unit, and the reading unit are disposed on a plurality of substrates and are formed in a single chip, and wherein the plurality of substrates are connected to each other by a through silicon via (TSV) wide input/output (IO).

(B19) An imaging apparatus, comprising: an imaging device, wherein the imaging device includes: a pixel generation unit that generates an image signal formed from a plurality of pixel signals according to incident light; a frame memory that stores the image signal of a plurality of frames.

(B20) An electronic apparatus, comprising: an imaging device, wherein the imaging device includes: a pixel generation unit that generates an image signal formed from a plurality of pixel signals according to incident light, and a frame memory that stores the image signal of a plurality of frames.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 imaging device
11 input OF
12 pixel output control unit
13 V decoder
14 memory control unit
15 frame counter
16 pixel generation unit
17 AD conversion unit
18 first signal processing unit
19 scene detection unit
20 frame memory
21 second signal processing unit
22 output OF
30 HOST ISP
41 encoder
42 decoder

What is claimed is:

1. An imaging device, comprising:
    a pixel generation unit that generates image data formed from a plurality of pixel signals according to incident light;
    a frame memory that stores the image data as a plurality of frames, wherein the frame memory includes a first area and a second area;
    a writing unit that writes the image data to the frame memory;
    a control unit that controls the writing unit during a first mode of operation to write the image data to the first area and not the second area, and controls the writing unit during a second mode of operation to write the image data to the second area and not the first area; and
    a reading unit that reads the image data written into the frame memory,
    wherein the writing unit writes the image data to the frame memory at a first frame rate,
    wherein the first area has more storage capacity than the second area, and
    wherein the control unit controls the reading unit to read image data from the first area during the first mode of operation, and controls the reading unit to read image data from the second area during the second mode of operation.

2. The imaging device according to claim 1, further comprising:
    an encoding unit that encodes the image data written into the frame memory; and
    a decoding unit that decodes the coded image data read from the frame memory, wherein the first mode of operation is a normal mode of operation, and the second mode of operation is a mode in which a high speed transition scene has been detected in the image data.

3. The imaging device according to claim 1, wherein the pixel generation unit performs at least one of changing an angle of view of the generated image data or adding the plurality of pixel signals.

4. The imaging device according to claim 1, wherein the pixel generation unit, the frame memory, the writing unit, and the reading unit are disposed on one substrate and are formed in a single chip.

5. The imaging device according to claim 1, wherein the pixel generation unit, the frame memory, the writing unit, and the reading unit are disposed on a plurality of substrates and are formed in a single chip.

6. The imaging device according to claim 1, wherein the pixel generation unit, the frame memory, the writing unit, and the reading unit are disposed on a plurality of substrates and are formed in a single chip, and wherein the plurality of substrates are connected to each other by a through silicon via (TSV) wide input/output (IO).

7. The imaging device according to claim 1, wherein the writing unit overwrites a previously written frame of generated image data in at least the first area of the frame memory,
    wherein in the second mode of operation the reading unit reads the image data from the second area of the frame memory at a second frame rate that is less than the first frame rate, and
    wherein in the first mode of operation the reading unit does not read the second area of the frame memory.

8. The imaging device according to claim 7, wherein the control unit controls the writing unit to cause overwriting of the generated image data into the at least the first area of the frame memory to stop in response to the control unit receiving a trigger signal.

9. The imaging device according to claim 8, wherein the writing unit stops the overwriting of the generated image data into the at least the first area of memory one of immediately after receiving a signal from the control unit or after a delay of a predetermined number of frames after receiving the signal from the control unit.

10. The imaging device according to claim 8, further comprising:
a detection unit that detects a high-speed transition scene in the image data overwritten into the at least the first area of the frame memory, wherein, by the detection of the high-speed transition scene as the trigger signal, the control unit controls the writing unit to cause the overwriting of the generated image data into the first area of the frame memory to stop.

11. The imaging device according to claim 8, wherein after the overwriting of the image data to the at least the first area of the frame memory has stopped, the reading unit reads the image data remaining in the at least the first area of the frame memory.

12. The imaging device according to claim 8, wherein the trigger signal is an indication that a high speed transition scene has been detected, and wherein the trigger signal is provided from a source outside of the imaging device.

13. The imaging device according to claim 12, wherein the writing unit writes the generated image data into the second area of the frame memory after the overwriting is stopped, and wherein the reading unit reads the image data written into the second area of the frame memory and further reads the image data remaining in the first area of the frame memory after the overwriting is stopped.

14. The imaging device according to claim 8, wherein after the overwriting of the image data to the at least the first area of the frame memory has stopped, the writing unit writes image data to the second area of the frame memory.

15. The imaging device according to claim 14, wherein after the overwriting of the image data to the at least the first area of the frame memory has stopped, the reading unit reads image data from the second area of the frame memory.

16. The imaging device according to claim 14, wherein after the overwriting of the image data to the at least the first area of the frame memory has stopped, the reading unit reads image data from the first area of the frame memory and from the second area of the frame memory.

17. The imaging device according to claim 16, wherein the reading unit reads image data from the first area of the frame memory and from the second area of the frame memory at a third frame rate that is less than the first frame rate and greater than the second frame rate.

18. An imaging apparatus, comprising:
an imaging device, wherein the imaging device includes:
a pixel generation unit that generates image data formed from a plurality of pixel signals according to incident light;
a frame memory that stores the image data as a plurality of frames, wherein the frame memory includes a first area and a second area;
a writing unit that writes the image data to the frame memory;
a control unit that controls the writing unit during a first mode of operation to write the image data to the first area and not the second area, and controls the writing unit during a second mode of operation to write the image data to the second area and not the first area; and
a reading unit that reads the image data written into the frame memory,
wherein the writing unit writes the image data to the frame memory at a first frame rate,
wherein the first area has more storage capacity than the second area, and
wherein control unit controls the reading unit to read image data from the first area during the first mode of operation, and controls the reading unit to read image data from the second area during the second mode of operation.

19. An electronic apparatus, comprising:
an imaging device, wherein the imaging device includes:
a pixel generation unit that generates image data formed from a plurality of pixel signals according to incident light, and
a frame memory that stores the image data as a plurality of frames, wherein the frame memory includes a first area and a second area;
a writing unit that writes the image data to the frame memory;
a control unit that controls the writing unit during a first mode of operation to write the image data to the first area and not the second area, and controls the writing unit during a second mode of operation to write the image data to the second area and not the first area; and
a reading unit that reads the image data written into the frame memory,
wherein the writing unit writes the image data to the frame memory at a first frame rate,
wherein the first area has more storage capacity than the second area, and
wherein control unit controls the reading unit to read image data from the first area during the first mode of operation, and controls the reading unit to read image data from the second area during the second mode of operation.

* * * * *